United States Patent
Fowler et al.

(10) Patent No.: US 10,627,292 B1
(45) Date of Patent: Apr. 21, 2020

(54) INDOOR GUNSHOT DETECTION ANALYSIS DURING ONGOING FIRE ALARM

(71) Applicant: Shooter Detection Systems, LLC, Newburyport, MA (US)

(72) Inventors: Ronald A Fowler, Westford, MA (US); Richard Thomas Onofrio, Arlington, MA (US)

(73) Assignee: Shooter Detection Systems, LLC, Newburyport, MA (US)

( * ) Notice: Subject to any disclaimer, the term of this patent is extended or adjusted under 35 U.S.C. 154(b) by 245 days.

(21) Appl. No.: 15/680,800

(22) Filed: Aug. 18, 2017

Related U.S. Application Data

(63) Continuation of application No. 15/613,161, filed on Jun. 3, 2017, now abandoned, which is a continuation-in-part of application No. 15/498,283, filed on Apr. 26, 2017.

(60) Provisional application No. 62/345,465, filed on Jun. 3, 2016, provisional application No. 62/379,023, filed on Aug. 24, 2016, provisional application No.
(Continued)

(51) Int. Cl.
*G01J 1/42* (2006.01)
*G01J 5/02* (2006.01)
*G01V 1/00* (2006.01)

(52) U.S. Cl.
CPC . *G01J 5/02* (2013.01); *G01J 1/42* (2013.01); *G01V 1/001* (2013.01)

(58) Field of Classification Search
CPC .............. G01J 5/02; G01J 1/42; G01V 1/001
See application file for complete search history.

(56) References Cited

U.S. PATENT DOCUMENTS

| 5,930,202 A | 7/1999 | Duckworth et al. |
| 6,178,141 B1 | 1/2001 | Duckworth et al. |

(Continued)

FOREIGN PATENT DOCUMENTS

| WO | WO0073811 A1 | 12/2000 |
| WO | WO2009046367 A1 | 4/2009 |

(Continued)

OTHER PUBLICATIONS

González-Castano, Francisco Javier, et al. "Acoustic sensor planning for gunshot location in national parks: A pareto front approach." Sensors 9.12 (2009): 9493-9512.

*Primary Examiner* — Daniel Pihulic
(74) *Attorney, Agent, or Firm* — Adams Intellex, PLC

(57) ABSTRACT

Indoor gunshot detection analysis is performed in the presence of a fire alarm. A gunshot sensor, which includes infrared and acoustic sensors, is used to detect an infrared pulse, whether the pulse originates from a muzzle flash or a fire alarm strobe. The infrared pulse is determined to correspond to a strobe occurrence. An evaluation determines that a gunshot did or did not occur based on the strobe occurrence. In another embodiment, a gunshot is detected while the fire alarm is occurring, where the gunshot occurs at a different time from the strobe occurrence and can be sensed by the acoustic sensor. A fire alarm strobe frequency and duration are determined, and further strobe occurrences are edited. Editing detection edits out a sensing time window by the infrared sensor. When the strobe stops, editing is eliminated, but if the strobe restarts, then editing is resumed.

27 Claims, 16 Drawing Sheets

Related U.S. Application Data

62/429,754, filed on Dec. 3, 2016, provisional application No. 62/327,552, filed on Apr. 26, 2016.

(56) References Cited

U.S. PATENT DOCUMENTS

| | | | |
|---|---|---|---|
| 6,621,764 B1* | 9/2003 | Smith | F41H 11/00 367/128 |
| 6,847,587 B2 | 1/2005 | Patterson et al. | |
| 7,203,132 B2 | 4/2007 | Berger | |
| 7,233,546 B2* | 6/2007 | Berkovich | G01S 11/12 367/128 |
| 7,266,045 B2 | 9/2007 | Baxter et al. | |
| 7,411,865 B2 | 8/2008 | Calhoun | |
| 7,474,589 B2 | 1/2009 | Showen et al. | |
| 7,532,542 B2 | 5/2009 | Baxter et al. | |
| 7,586,812 B2 | 9/2009 | Baxter et al. | |
| 7,599,252 B2 | 10/2009 | Showen et al. | |
| 7,602,329 B2 | 10/2009 | Manderville et al. | |
| 7,688,679 B2 | 3/2010 | Baxter et al. | |
| 7,710,278 B2 | 5/2010 | Holmes et al. | |
| 7,719,428 B2 | 5/2010 | Fisher et al. | |
| 7,732,769 B2* | 6/2010 | Snider | G06K 9/00771 250/336.1 |
| 7,750,814 B2 | 7/2010 | Fisher et al. | |
| 7,751,282 B2 | 7/2010 | Holmes et al. | |
| 7,755,495 B2 | 7/2010 | Baxter et al. | |
| 7,796,470 B1 | 9/2010 | Lauder et al. | |
| 7,855,935 B1 | 12/2010 | Lauder et al. | |
| 7,947,954 B2* | 5/2011 | Snider | G06K 9/00771 250/336.1 |
| 7,961,550 B2 | 6/2011 | Calhoun | |
| 8,036,065 B2 | 10/2011 | Baxter et al. | |
| 8,063,773 B2 | 11/2011 | Fisher et al. | |
| 8,134,889 B1 | 3/2012 | Showen et al. | |
| 8,304,729 B2* | 11/2012 | Snider | G06K 9/00771 250/336.1 |
| 8,325,562 B2 | 12/2012 | Showen | |
| 8,325,563 B2 | 12/2012 | Calhoun et al. | |
| 8,351,297 B2 | 1/2013 | Lauder et al. | |
| 8,369,184 B2 | 2/2013 | Calhoun | |
| 8,478,319 B2 | 7/2013 | Azimi-Sadjadi et al. | |
| 8,642,961 B2* | 2/2014 | Snider | G06K 9/00771 250/336.1 |
| 8,995,227 B1 | 3/2015 | Johnson | |
| 9,240,114 B2 | 1/2016 | Showen et al. | |
| 2004/0100868 A1 | 5/2004 | Patterson, Jr. et al. | |
| 2008/0219100 A1 | 9/2008 | Fisher et al. | |
| 2010/0058947 A1 | 3/2010 | Davis et al. | |
| 2010/0278013 A1 | 11/2010 | Holmes et al. | |
| 2012/0300587 A1 | 11/2012 | Azimi-Sadjadi et al. | |
| 2013/0343602 A1* | 12/2013 | Snider | G06K 9/00771 382/103 |
| 2014/0361886 A1 | 12/2014 | Cowdry | |
| 2015/0070166 A1 | 3/2015 | Boyden et al. | |
| 2015/0071038 A1 | 3/2015 | Boyden et al. | |
| 2015/0177363 A1 | 6/2015 | Hermann et al. | |
| 2015/0268170 A1 | 9/2015 | Scott et al. | |
| 2015/0347902 A1 | 12/2015 | Butler, Jr. et al. | |
| 2016/0086472 A1 | 3/2016 | Herrera et al. | |
| 2016/0133107 A1 | 5/2016 | Showen et al. | |
| 2016/0203809 A1* | 7/2016 | Brock-Fisher | B06B 1/0292 600/459 |
| 2016/0225242 A1 | 8/2016 | Kane et al. | |
| 2016/0232774 A1* | 8/2016 | Noland | G08B 13/1672 |
| 2016/0260307 A1 | 9/2016 | Skorpik et al. | |
| 2017/0123038 A1 | 5/2017 | Griggs et al. | |
| 2017/0169686 A1 | 6/2017 | Skorpik et al. | |
| 2019/0180728 A1* | 6/2019 | Alie | A61B 8/00 |

FOREIGN PATENT DOCUMENTS

| | | |
|---|---|---|
| WO | WO2009048500 A2 | 4/2009 |
| WO | WO2009085361 A2 | 7/2009 |
| WO | WO2010039130 A1 | 4/2010 |
| WO | WO2010085822 A2 | 7/2010 |
| WO | WO2012103153 A2 | 8/2012 |
| WO | WO2014070174 A1 | 5/2014 |
| WO | WO2014165459 A2 | 10/2014 |

* cited by examiner

INDOOR GUNSHOT DETECTION ANALYSIS DURING ONGOING FIRE ALARM

RELATED APPLICATIONS

This application is a continuation of U.S. patent application "Indoor Gunshot Detection Analysis with Ongoing Fire Alarm" Ser. No. 15/613,161, filed Jun. 3, 2017, which claims the benefit of U.S. provisional patent applications "Indoor Gunshot Detection Analysis with Ongoing Fire Alarm" Ser. No. 62/345,465, filed Jun. 3, 2016, "Gunshot Detection within an Indoor Environment" Ser. No. 62/379,023, filed Aug. 24, 2016, and "Testing of Gunshot Sensors" Ser. No. 62/429,754, filed Dec. 3, 2016.

The application "Indoor Gunshot Detection Analysis with Ongoing Fire Alarm" Ser. No. 15/613,161 is a continuation-in-part of U.S. patent application "Indoor Gunshot Detection with Video Analytics" Ser. No. 15/498,283, filed Apr. 26, 2017, which claims the benefit of U.S. provisional patent applications "Indoor Gunshot Detection with Video Analytics" Ser. No. 62/327,552, filed Apr. 26, 2016, "Indoor Gunshot Detection Analysis with Ongoing Fire Alarm" Ser. No. 62/345,465, filed Jun. 3, 2016, "Gunshot Detection within an Indoor Environment" Ser. No. 62/379,023, filed Aug. 24, 2016, and "Testing of Gunshot Sensors" Ser. No. 62/429,754, filed Dec. 3, 2016.

The foregoing applications are each hereby incorporated by reference in their entirety.

FIELD OF INVENTION

This application relates generally to gunshot detection and more particularly to indoor gunshot detection analysis with an ongoing fire alarm.

BACKGROUND

The sound of gunshots in the wrong context is a very scary sound. In some contexts, gunshot sounds are not at all out of place, such as in the woods during hunting season or at a firing range. However, in many contexts, both indoors and outdoors, the sound of a gunshot or gunshots is extremely alarming. In many public settings, such as a crowded outdoor marketplace, the sound of gunshots will cause confusion, panic, mob response, and other bad outcomes. However in an indoor environment, the sound of gunshots will often lead to even worse consequences, due to the enclosure of the indoor setting and its associated constrained egress. Getting a quick response from knowledgeable law enforcement officers is critical in minimizing chaos in an indoor gunshot scenario.

Gunshot detection by electronic devices, rather than by humans, is performed for a variety of purposes and applications that include the military, law enforcement, security, and public safety. Gunshot detection is a complex problem because of the variety of weapons and explosive devices that can produce the gunshot event. Identifying the source of the gunshot is critical to identifying and tracking a suspected shooter. The identification of the source of the gunshot is complicated by many factors including the environment in which the gunshot event occurs. Gunshot detection and shooter identification are critical elements in many military, law enforcement, security, and public safety scenarios.

Some early work in detecting gunshots in an outdoor setting involved several microphones spread out over a large distance. A gunshot is often so loud it can be heard many thousands of feet, even miles, away in an outdoor setting. The occurrence of a gunshot would then register on the microphones, but at slightly different times. Because the speed of sound in dry air at sea level at 68° Fahrenheit is about 1125 feet/second, a gunshot somewhere between two microphones that are 2500 feet apart would be detected at the microphones one or even two seconds apart, which is an easily detectable difference. Furthermore, the relative times of detection are an indication of the proximity of the gunshot to one microphone versus another microphone. Unfortunately, this scheme does not distinguish between gunshots and other similar sounds, such as car backfires, construction noises, fireworks, etc.

The difficulty of indoor gunshot detection is many times more complicated than outdoor gunshot detection. For the indoor setting, many complicating factors intrude upon accurate gunshot detection. For example, in an indoor setting, the probability of extensive sound reverberations and echoes from the initial gunshot is very high. In addition, rooms within the indoor setting often have convoluted acoustic pathways. These acoustic pathways are often blocked by closed doors, which cause many decibels of sound attenuation. Furthermore, indoor settings are often spread over multiple floors and replete with crowds of people, which makes handling indoor gunshot situations extremely challenging for law enforcement officers or other public safety personnel. Additionally, many other distracting sonic and visual interferences may be present in a crowded, indoor environment, including screams, flashlights, police alarms, building alarms, fire alarms, earthquake alarms, tornado alarms, and the like. Therefore, accurate gunshot detection in an indoor environment is an important element of public safety that has so far proved to be largely elusive.

SUMMARY

Gunshot detection, whether outdoor or indoor, is critical to many applications, such as public safety, law enforcement, defense, and security. While the motivations for gunshot detection vary, the objectives consistently remain the same: to quickly identify and respond to a gunshot event. Scientifically speaking, a gunshot event produces signals that include both optical components and acoustic components. The optical components, namely infrared (IR) and visible light signals, result from the muzzle flash. The muzzle flash occurs when the combusting gases that expel the projectile from the firearm escape from the muzzle of the firearm. The acoustic components result from the muzzle blast expelling the projectile and any shock wave from a projectile traveling at supersonic velocities. Indoor gunshot detection is based on detecting an infrared pulse and an acoustic impulse that result from discharging a firearm within an enclosed space. Indoor gunshot detection is used for determining that a gunshot or gunshots have occurred and for initiating plans to respond to the gunshots. Gunshot response plans can include identifying and locating lawbreakers and combatants, assigning rapid response resources, and so on.

The ability to detect indoor gunshots accurately and quickly is complicated by the nature and response of the IR and acoustic signals used to detect the gunshot. IR pulse detection is best performed when there is a line of sight from the IR detector to the gunshot event. Since an indoor environment typically includes rooms, hallways, doors, and other obstructions, proper placement of IR detectors is critical. Furthermore, other events such as fire alarm strobes can cause IR pulses. Acoustic impulse detection includes detecting high sound-pressure levels that result from gunshots and explosions. Fire alarms and strobes risk duping the gunshot detection system into misinterpreting a fire alarm for a gunshot, or worse, missing a gunshot that occurred while a fire alarm event was occurring.

A processor-implemented method for gunshot analysis is disclosed comprising: using a gunshot sensor to detect an infrared pulse, wherein the gunshot sensor comprises: an infrared sensor an acoustic sensor; determining that the infrared pulse corresponds to a strobe occurrence; and evaluating that a gunshot has occurred based on the strobe occurrence. In embodiments, the method further comprises detecting a gunshot, while the fire alarm is occurring, based on information from the infrared sensor and the acoustic sensor. The method can further comprise determining a frequency of strobe occurrences. In some embodiments, the method further comprises editing detection of further strobe occurrences based on the frequency of strobe occurrences. In embodiments, the method further comprises detecting a second infrared pulse corresponding to a second sequence of strobes and editing detection of a second set of further strobe occurrences based on the frequency of a second sequence of strobes.

In embodiments, a system for gunshot detection comprises: a plurality of gunshot sensor units used to detect an infrared pulse, wherein each of the plurality of gunshot sensor units comprise: an infrared sensor and an acoustic sensor; an analyzer, coupled to the plurality of gunshot sensor units wherein the analyzer: detects an infrared pulse, based on information collected from a gunshot sensor from the plurality of gunshot sensor units; determines that the infrared pulse corresponds to a strobe occurrence; and evaluates that a gunshot occurred based on the strobe occurrence. In embodiments, a computer program product embodied in a non-transitory computer readable medium for gunshot detection, the computer program product comprising code which causes one or more processors to perform operations of: using a gunshot sensor to detect an infrared pulse, wherein the gunshot sensor comprises: an infrared sensor and an acoustic sensor; determining that the infrared pulse corresponds to a strobe occurrence; and evaluating that a gunshot occurred based on the strobe occurrence.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
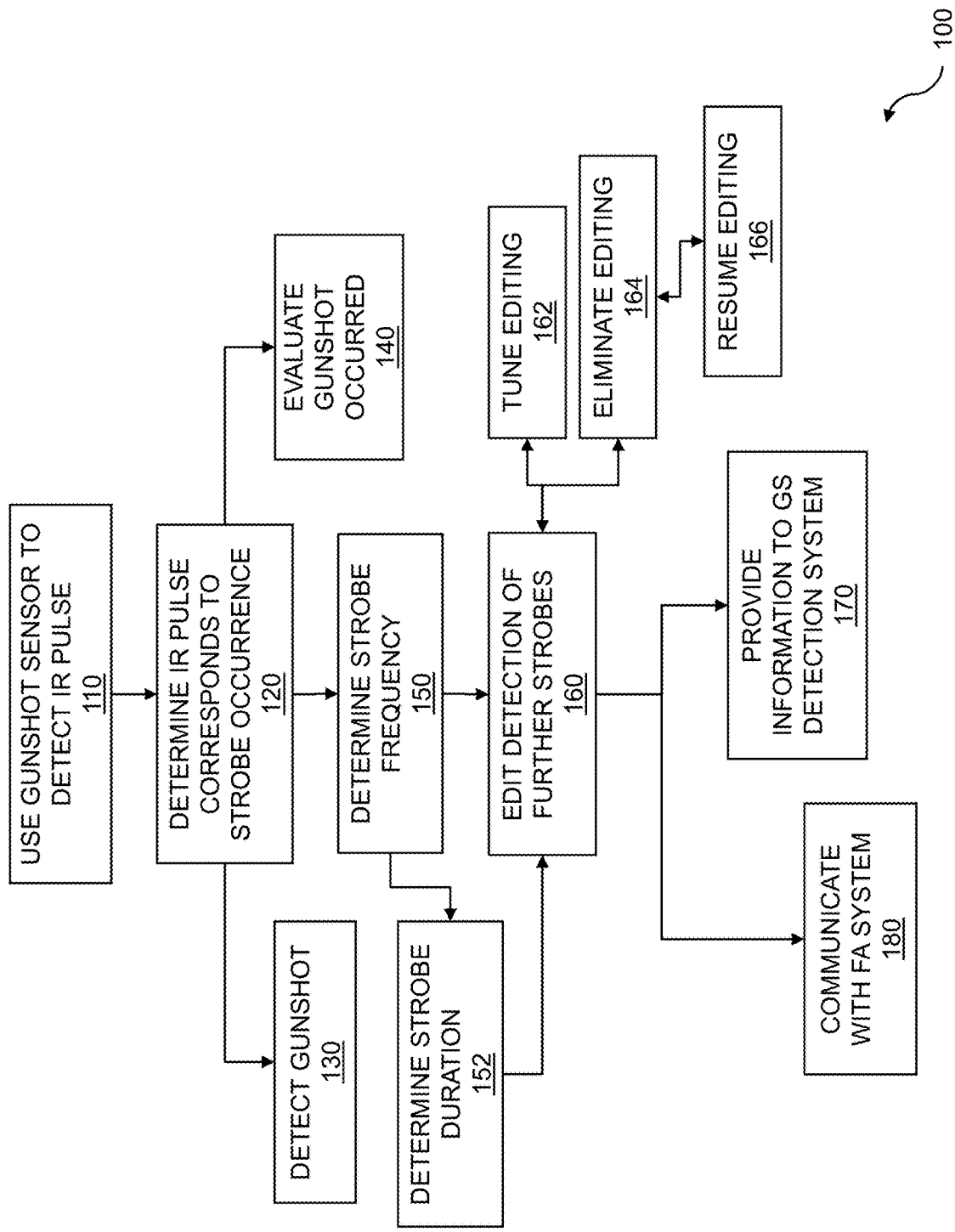
FIG. 1 is a flow diagram for gunshot analysis.

Gun violence has become a widely-publicized issue in recent years. According to recent statistics, one in three people in the United States knows someone who has been shot. On average, 31 Americans are murdered with guns every day, and 151 are treated for a gun assault in emergency rooms every day. In 2015 alone, more than 12,000 people were killed in the United States by a gun, and many more were injured. Gun violence has unfortunately occurred in a variety of public places, such as schools, places of worship, sporting events, nightclubs, and airports. While the use of metal detectors and other security measures can be employed in an attempt to prevent firearms in such venues, these incidents of gun violence in public continue to be a major issue.

Due to the aforementioned situations, the ability to quickly detect gunshots has become critical for the safe operation of a variety of public and private organizations such as military defense, local law enforcement, public and private security, and public safety. Gunshot detection permits security personnel in a variety of organizations to quickly deploy resources to protect lives and property by reacting appropriately to the given event. To be especially valuable, gunshot analysis needs to occur in as close to real-time as possible. Near real-time analysis is that which occurs immediately before and after a suspected gunshot, as well as during the suspected gunshot event. Reviewing a video monitoring recording hours or even days after the event may be helpful in a crime investigation, but having real-time and near real-time analysis is vastly superior in minimizing the harm caused by the attacker. Real-time or near real-time analysis includes both audio and video data from the scene of the suspected gunshot. And in the sad event that multiple gunshots occur, additional gunshot analysis is needed to determine whether one or more perpetrators of the gunshots exist and, if there are more than one, whether they are in the same or different rooms. Discrimination between gunshot flashes and other sources of brief, intense light such as a fire alarm strobe light must also be carefully taken into account in the analysis.

Gunshot detection is a complex process, as the gunshot event is a function of multiple factors including the weapon and/or ammunition used, the environment in which the gunshot event occurs, the spectra of the gunshot event, and so on. When a weapon is fired, various physical events occur. In the case of a typical firearm such as a pistol or rifle, a combination of optical and acoustic events occurs. There is a flash that typically occurs when the projectile (e.g. bullet) is expelled from the muzzle of the weapon. The flash can include infrared light spectra and visible light spectra. There is a muzzle blast that results from the expulsion of the projectile. The muzzle blast typically includes a high sound-pressure level wave event that manifests as a crack, boom, or other such sound. There can also be a shock wave that results from the projectile traveling through air. This latter event occurs particularly with projectiles traveling at supersonic speeds. A muzzle blast can reflect off of buildings and down alleys, off of rock faces, hillsides, and edges of forests, and across water, walls, desks, furniture, bookcases, partitions, windows, mirrors, and other surfaces. Thus, although there are numerous challenges in gunshot detection, it remains an important tool for law enforcement and can serve to prevent additional loss of life during a mass shooting event.

Detection of gunshots is critical within an indoor environment. It is crucial to be able to identify true gunshots, with their corresponding muzzle flashes and loud acoustic signatures, while the elimination of any false alerts is likewise important. Once a gunshot is detected, it is then even more critical to analyze the gunshot situation. If the perpetrator of the gunshot can be identified quickly and in real-time, a huge benefit accrues to law enforcement and other officials, as it shortens the time they need to respond appropriately. Furthermore, tracking the identified suspected shooter in real-time or near real-time by tagging a figure in the video data can be infinitely valuable to law enforcement and other officials. A gunshot sensor can be placed in an indoor environment. The gunshot sensor can include multiple individual sensors, including, but not limited to, an acoustic sensor and an infrared sensor. The acoustic sensor can detect an acoustic pressure wave, which is often emitted by a firearm when it is fired. Additionally, a firearm typically emits energy within the infrared spectrum when fired. Thus, by detecting the infrared emission coincidental with a detected acoustic pressure wave, a presumption of a gunshot can be inferred. The acoustic sensor can be configured to detect the initial pressure wave emitted from a firearm. By design, the acoustic sensor can only initially detect very loud, sudden bursts of acoustic energy associated with a gunshot, such as shock waves and/or loud blasts. Other noises, such as loud music, slamming doors, and voices do not trigger the acoustic pressure sensor. Disclosed methods include discrimination between real gunshots and other, spurious noises. Once a real gunshot has been detected, video streams are engaged to quickly enable video analysis and identification of a suspected shooter within the video stream feed. Having a real-time analysis of the video stream is exponentially more valuable than law enforcement personnel crawling through video after the fact. In addition, sounds from the scene of the gunshot are near-simultaneously engaged for further real-time analysis.

Thus, disclosed sensors provide numerous advantages. One such advantage is a legal benefit in that the acoustic sensor does not record voices as a traditional microphone would. This maintains privacy in the indoor environment, as the acoustic sensor does not pick up conversations that might be transpiring in the environment. Another key advantage is that the acoustic sensor is configured to detect the primary acoustic wave from the firearm, but it will evaluate the confusing reverberations and echoes from reflections and reverberations, which are known as secondary acoustic waves, to determine whether they are primary or ignorable. Since these secondary acoustic waves that might be reflected from walls and other surfaces in the indoor environment are evaluated in combination with the IR detection, they can be appropriately ignored by the acoustic sensor, thus facilitating a position-independent gunshot sensor. There is therefore no need for special calibrations for a given indoor environment. This is particularly advantageous in large indoor environments such as schools, airports, gymnasiums, and sporting arenas. Thus, the analyzing can be accomplished without tuning the gunshot sensor for the indoor environment in which the gunshot sensor resides. In such environments, multiple gunshot sensors can be used. The installation of the gunshot detection system in these indoor environments is straightforward and time-efficient because there is no need to specifically select a particular position within the indoor environment, nor is there a need for any pre-use calibration. This enables the disclosed systems to be quickly and efficiently installed in indoor environments, thus providing the desired gunshot detection in important transportation venues, entertainment venues, hospitals, and other large, public, indoor environments.

In some configurations, multiple gunshot sensors are used, and they are connected to a gateway device that receives feedback from the gunshot sensors and can report the data upstream to a monitoring system, emergency warning system, or another suitable system. The gateway device can be a central analyzer, or processor, that takes input from multiple gunshot sensors and provides a composite analysis of the detected gunshots. In some configurations, the central analyzer function is partially distributed among the various gunshot sensors in addition to being centrally analyzed. In some configurations, the gunshot sensor can further include a video camera and a microphone. The microphone can be connected to a pickup circuit with its gain set such that the microphone only picks up very loud noises (e.g. 130 decibels or greater), such as a muzzle blast, and does not pick up ordinary conversation. In some embodiments, the video camera and microphone are only activated after a gunshot detector detects a possible gunshot. Thus, if a gunshot is detected in the indoor environment, the microphone and video camera can be activated to attempt to record audio and video of the scene and possibly record audio and video of the suspect(s) that fired the gunshot. In such embodiments, the gunshot sensor enters a surveillance mode once a gunshot has been detected, and the gain of the microphone circuit can be adjusted to pick up additional sounds. The recorded audio and video information can be of tactical importance to law enforcement so that they can better understand the extent of injuries and casualties, as well as to assess the number of shooters on the scene.

Another challenge of gunshot detection in an indoor environment is the various external environmental factors that can occur in temporal proximity to a gunshot. For example, a fire alarm can create both a very loud noise and a flashing strobe. In a nightclub, music can be very loud, and there might be a multitude of strobes and other flashing lights. Disclosed systems can accommodate such environmental factors and still provide effective gunshot detection with one or more position-independent gunshot sensors placed within an indoor environment, thus providing effective and efficient gunshot monitoring, and improving public safety in contextually varying indoor environments.

A typical firearm discharge involves various phenomena. There is a muzzle flash, which emits visible and infrared light. A muzzle flash typically comprises multiple phases, which include a primary flash, an intermediate flash, and a secondary flash. The primary flash results as hot, highly compressed gases, which are the unburned propellants, exit the barrel along with the projectile. These gases expand rapidly without mixing with the atmosphere, and then rebound. This creates a high-temperature region that produces the intermediate flash. As oxygen mixes with the unburned propellants, ignition occurs, causing the secondary flash. A majority of the radiated energy corresponding to the muzzle flash occurs during the secondary flash, and most of the total radiated energy is part of the infrared spectrum. This is in contrast to other environmental factors within an indoor environment, such as fire alarm strobes. A fire alarm strobe can be identified algorithmically because there is a large IR burst during the instantaneous heat-up of the strobe, which then bleeds into several spectra, including the visible spectrum, with a much lower IR component. Thus, detecting IR energy and associated spectra is an important aspect of distinguishing gunshots from other flashing light sources.

A shock wave can also occur, which is caused by the supersonic travel of the projectile/bullet. A supersonic bullet causes a distinctive shock wave pattern as it moves through the air. The shock wave expands as a cone behind the bullet, with the wave front propagating outward at the speed of sound. As the shock wave propagates, the nonlinear behavior of the air causes the pressure disturbance to form an "N" shape with a rapid onset, a ramp to the minimum pressure, and then an abrupt offset. Most events within an indoor environment do not cause a shock wave. For example, a door slamming, while perceived as loud to someone within its hearing, does not cause a shock wave such as that resulting from supersonic travel of a projectile. Thus, detection of a shock wave can be an important factor in gunshot detection. However, shock waves are largely dependent on the orientation of projectile motion. Hence, the direction of the gunshot in relation to the gunshot detector can affect the magnitude of the detected shock wave. Furthermore, there can be a muzzle blast, which is the sound caused by the discharge of the firearm. A typical firearm uses a confined explosive charge to push the bullet out of the gun barrel. The hot, rapidly expanding gases cause a muzzle blast to emerge from the barrel. The acoustic disturbance can have a duration in the range of 3 to 5 milliseconds and propagates through the air at the speed of sound.

Gunshot detection is a critical task and key priority of law enforcement, public safety officials, and the military. With local, state, and federal budgets stretched thin, efficient and cost effective identification of a gunshot event has become paramount. When a gunshot event is determined to have occurred, officials desire to quickly identify the source of the gunshot event and to glean as much additional information as possible about the event. The additional information includes number of shooters, weapons available to the shooters, direction of movement of shooters, etc. This additional information is essential to tactical deployment of equipment and personnel to neutralize the situation as quickly and as safely as possible.

Analysis of indoor gunshot detection with an ongoing fire alarm is described. Currently, gunshot detection techniques detect gunshots in outdoor and indoor environments by gathering the gunshot event data using sensors, and then analyzing the gathered data. However, these same gunshot detection techniques can be confounded by concurrent events that generate data similar to the data generated by the gunshot event. It is desirable to mask or filter out the data attributable to the concurrent events so that the analysis can focus on the detection of a gunshot event. Disclosed embodiments accomplish the gunshot detection analysis during an ongoing fire alarm by editing out a time window for sensing event data. The time window is tuned as more information on the occurring fire alarm event is gathered. By editing out the time window for sensing the fire alarm event data, the analysis remains focused on detecting a gunshot event without the computational overhead of analyzing spurious, undesirable events.

Increasingly, gunshot detection is seen as a critical task and a key priority of public safety officials, law enforcement, the military, and even private organizations such as businesses. Gunshot detection provides a cost-effective technique to quickly identify needs, activate response plans, and deploy resources as necessary. Once a gunshot event is determined to have occurred, officials need to quickly identify the source of the gunshot event and to glean as much additional information as possible about the event, such as the number of shooters, weapons used, direction and movement of shooters, etc. This additional information is essential to tactically deploy equipment and personnel in order to neutralize the situation as quickly and safely as possible.

A gunshot typically includes optical and acoustic signal components. The optical components of the gunshot include infrared and visible light signals, while the acoustic components include a high sound-pressure level from a muzzle blast, and a shockwave associated with supersonic travel of a projectile. The technique of gunshot detection analysis includes gathering infrared and acoustic information from an event by using infrared and acoustic sensors, respectively. However, the gunshot detection analysis can be confused by events that generate infrared impulses that are similar to those generated by the gunshot event. An ongoing fire alarm is just such an event. A fire alarm alerts the occupants of a building by pulsing high intensity light using a strobe and by emitting high volume tones or codes using a sounder. The fire alarm light from the strobe contains infrared components that are sufficiently similar to those of an optical flash from a firearm so as to "blind" the infrared sensor while the fire alarm is flashing. Flashing from the fire alarm causes a gunshot detector to process the fire alarm flashes in order to determine whether the flashes are from the fire alarm or from a firearm. The computational complexity of processing the flashes can cause the gunshot detector to erroneously label the fire alarm flashes as multiple gunshots, or worse, miss true gunshots all together.

The gunshot technique described herein determines that an infrared pulse corresponds to a strobe occurrence from a fire alarm, and evaluates that a gunshot occurred, based on the strobe occurrence. The acoustic sensor is used to sense an absence of an acoustic pressure wave corresponding to a gunshot during a timeframe of the strobe occurrence: that is, a flash occurred that was not accompanied by a high-level impulse sound normally associated with a gunshot event. Since the strobe occurrence is typically part of a sequence of strobes, a frequency and duration of the strobe occurrences can be determined. Detection can be edited such that a specific time window for sensing by the infrared sensor it edited out. A typical time window is less than or equal to four percent of the time period between strobe occurrences. The editing can be tuned as more information on the sequence of strobes is collected. If the strobe ceases flashing, which sometimes happens during ongoing fire alarms, the editing can be eliminated, leaving all of the processing for determining a gunshot event. If the strobe resumes flashing, the editing can be reinstated quickly without the need to re-compute strobe frequency and duration. The technique described above can be used to track the unsynchronized flashing of multiple fire alarms.

FIG. 1 is a flow diagram for gunshot analysis. Gunshot detection analysis can use a gunshot sensor to detect an infrared pulse, where the gunshot sensor can include an infrared sensor and an acoustic sensor. The infrared pulse can be determined to correspond to a strobe occurrence. A gunshot can be determined to have not taken place based on the strobe occurrence. A frequency of strobe occurrences can be determined, as can a duration for the strobes within the strobe occurrences. Editing detection can edit out a time window for sensing by the infrared sensor. The flow 100 includes using a gunshot sensor to detect an infrared pulse 110, where the gunshot sensor can include an infrared sensor and an acoustic sensor. In embodiments, the gunshot sensor includes other sensors such as a microphone, a visual sensor, etc. The gunshot sensor can be placed in an outdoor location or within an indoor location. In embodiments, the gunshot sensor is mounted on a wall, on a ceiling, etc., where the wall and/or the ceiling can be in an indoor room, in a hallway, in a common space such as a lounge or meeting room, and so on.

The flow 100 includes determining that the infrared pulse corresponds to a strobe occurrence 120. A fire alarm can include a strobe that produces a visible alert and a sounder that produces an alarm, codes, voice messages, etc. Thus strobe occurrence can comprise a fire alarm. When the fire alarm is activated, the alarm can produce visible strobes and can emit the alarm, codes, voice messages, etc. The fire alarm strobes can be produced at a frequency, and each strobe can have a duration. The light produced by the fire alarm strobe can include infrared light spectra, visible light spectra, and so on. The infrared spectra of the fire alarm strobe can be detected by the infrared sensor included in a gunshot sensor. The flow 100 includes evaluating that a gunshot occurred 140 based on the strobe occurrence. As discussed above, an activated fire alarm can produce a visual alert in the form of a series of strobes, and an audio alert in the form of an alarm, codes, voice messages, etc. The fire alarm strobes can be detected by the gunshot sensor as infrared pulses. A gunshot produces an infrared pulse from a muzzle flash, and it also produces a high sound-pressure level (e.g. 120 dB to 160 dB) impulse. When a gunshot occurs, both an infrared pulse and a high sound-pressure level impulse are detected. Without the high sound-pressure level, the detected infrared pulse can be attributed to a strobe occurrence that can include a fire alarm strobe.

The flow 100 includes detecting a gunshot 130, while the fire alarm is occurring, based on information from the infrared sensor and the acoustic sensor. As previously stated, a gunshot event includes an infrared pulse and a high sound-pressure impulse. The coincidence in time of the infrared pulse and the high sound-pressure level impulse can be attributed to the gunshot. Since the gunshot emits an infrared pulse and a high sound-pressure level, and the fire alarm emits a sequence of light pulses, where the light pulses include infrared spectra, visible light spectra, etc., detecting a gunshot occurrence can be complicated. In some embodiments, the gunshot occurs at a different time from the strobe occurrence. The gunshot can be differentiated from the fire alarm strobe by the coincidence of an infrared pulse and a high sound-pressure level for the gunshot. For the fire alarm strobe, the acoustic sensor can sense an absence of an acoustic pressure wave that can correspond to a gunshot during a timeframe of the strobe occurrence (e.g. no bang, no gunshot). When a gunshot and a fire alarm strobe produce infrared impulses at substantially the same time, the gunshot cannot be differentiated from the fire alarm strobe. The strobe occurrence can interfere with gunshot detection evaluation because the two strobes can be detected as one infrared pulse, where the infrared pulse can coincide with the high sound-pressure level impulse.

The flow 100 includes determining a frequency 150 of strobe occurrences. The determining of the frequency of strobe occurrences can be accomplished using various techniques, such as measuring a period of time between an infrared pulse and the next infrared pulse (seconds/cycle), and inverting the time period to get frequency (cycles/second). Since the time periods between successive infrared pulses might not be equal, a time tolerance can be determined. The flow 100 includes determining a duration 152 for strobes within the strobe occurrences. The duration for strobes within the strobe occurrences can be determined using various techniques, such as the time difference between a pulse rise and a pulse fall, the time difference between the 50-percent point of a pulse rise and the 50-percent point of a pulse fall, and so on. Since the durations of successive infrared pulses might not be equal, a time tolerance associated with pulse duration can be determined.

The flow 100 includes editing detection of further strobe occurrences 160 based on the frequency of strobe occurrences. Detecting infrared pulses and high sound-pressure waves requires analysis to determine whether the infrared pulses were attributable to a fire alarm or a muzzle blast from a gunshot. Infrared pulses could be falsely tagged as gunshots, or worse, true gunshots could be incorrectly tagged and missed as fire alarm strobes. To reduce the analysis load, infrared pulses that correspond to strobe occurrences can be edited. Editing can include editing out a time window for sensing by the infrared sensor. By making the infrared sensor ignore infrared pulses that correspond to the fire alarm strobe or strobes, the analysis can be reserved for detecting gunshots, tracking gunshots, etc. The editing can be performed based on the strobe frequency and based on the strobe duration. The flow 100 includes tuning the editing 162 as more information on the sequence of strobes is collected. The detection of additional infrared pulses can be used to detect pulse frequency, duration, and tolerance. As more pulses are detected, the editing can be tuned to more accurately track the fire alarm strobe occurrences and isolate them. Tuning can include better prediction of the time of arrival of the next infrared pulse from the fire alarm strobe, minimizing duration of the editing to minimize the amount of time the infrared sensor detection is edited out, and so on. The flow 100 includes eliminating the editing 164 once the further strobe occurrences discontinue. Fire alarms can produce strobes and produce alarms, codes, voice messages, etc., for a period of time, and can then stop the strobes for a period of time. During the time that the strobes are not flashing, the editing can be eliminated or suspended, since any infrared pulse that can be detected during the absence of a fire alarm strobe can be a gunshot. The flow 100 includes resuming the editing 166 when further strobe occurrences resume. Just as fire alarms can stop producing strobes, the fire alarms can resume producing strobes. Since the strobes from a given fire alarm are likely to be produced with the same frequency, duration, etc., as when previously produced, the editing can be substantially similar to the editing previously applied. Resuming the editing instead of re-computing pulse frequency, duration, tolerance, etc. from scratch can permit the editing to resume faster and with less processing overhead.

The flow 100 includes providing information 170 to a gunshot detection system, from the gunshot sensor, that a fire alarm is occurring based on the strobe occurrence. The information can be used in modifying detection by other sensors based on the fire alarm occurring. As discussed above, a fire alarm can produce visual alerts in the form of strobes, and audio alerts in the form of alarms, codes, voice messages, and so on. The strobes include infrared light spectra and visible light spectra. By providing information to a gunshot detection system that a fire alarm is occurring, the gunshot detection system can be alerted that some infrared pulses should be attributed to strobe occurrences from a sequence of strobes. The gunshot detection system can begin detecting infrared pulses corresponding to strobe occurrences, editing strobe occurrences, etc. The flow 100 includes communicating between a fire alarm system and a gunshot detection system 180, including the gunshot sensor, so that the fire alarm system can provide a fire alarm notification to the gunshot detection system of a fire alarm, and can further evaluate that a gunshot did not occur based on the fire alarm notification. Such communication can be used to enhance the discrimination between fire alarm strobes and gunshot events. The communication can be used to indicate that editing is necessary, to initiate editing, to control editing parameters (e.g. infrared pulse frequency, duration, tolerance, etc.), and so on. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
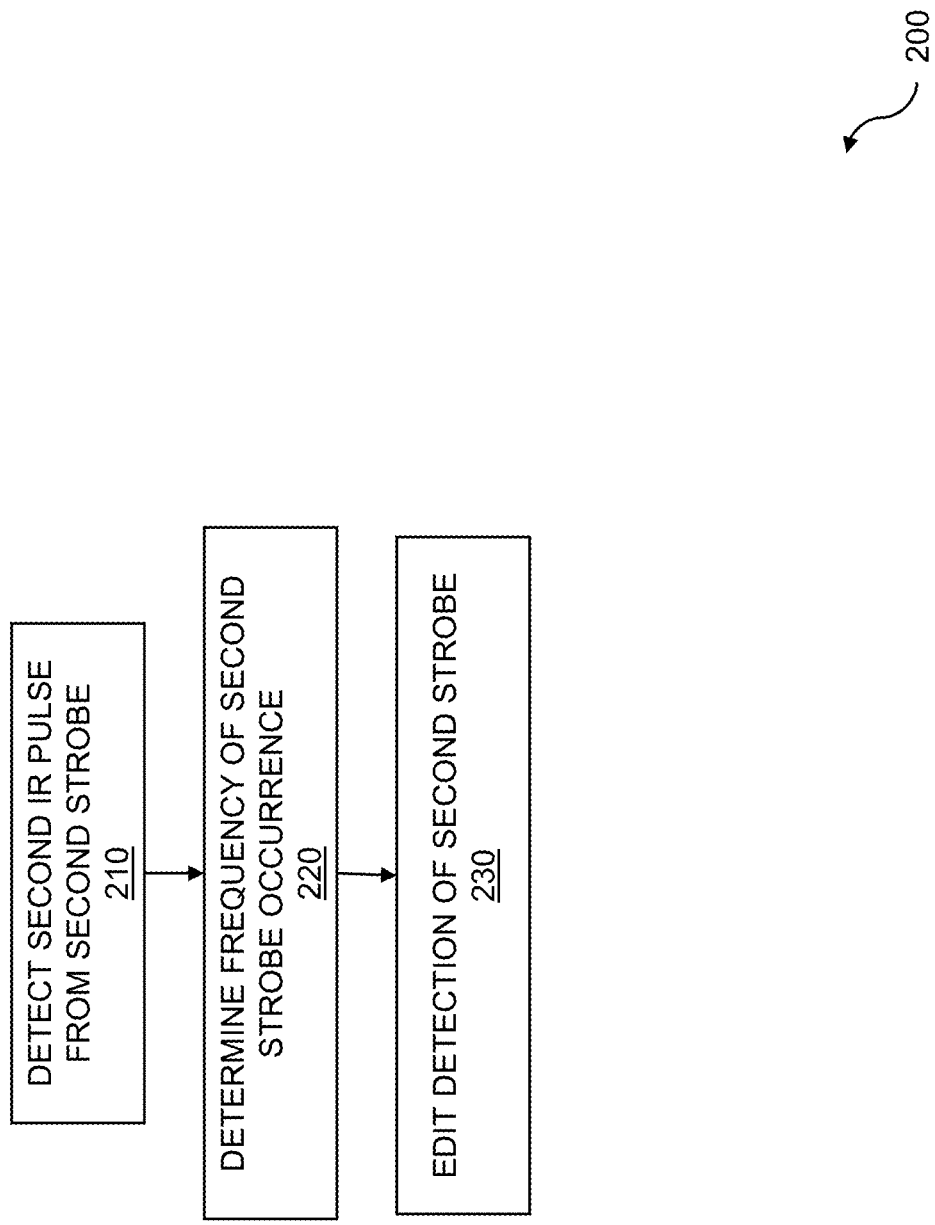
FIG. 2 is a flow diagram for second strobe evaluation.

FIG. 2 is a flow diagram for second strobe evaluation. The flow 200 may continue from or be part of the previous flow 100. The flow 200 includes detecting a second infrared pulse corresponding to a second sequence of strobes 210. The second sequence can be from a second strobe source. In certain configurations, a given gunshot detector can have a line of sight to a plurality of fire alarms. Since the fire alarms typically include strobes and sounders, the flashing of the one or more fire alarm strobes can produce infrared pluses that can be similar to infrared pulses generated by muzzle flashes from firearms. As was the case for the first sequence of strobes, the second sequence of strobes can be detected by the infrared sensor included in a gunshot sensor. The infrared pulses that result from the second sequence of strobes can be similar to the infrared pulses from the first sequence of strobes.

The flow 200 includes determining a frequency of strobe occurrence for the second sequence of strobes 220. A time period between a first strobe occurrence for the second sequence of strobes and a second strobe occurrence for the second sequence of strobes can be determined. By inverting the time period, the frequency of strobe occurrence for the second sequence of strobes can be calculated. The duration of strobe occurrence for a given strobe occurrence for the second sequence of strobes can also be determined. The duration of strobe occurrence can be determined based on a time difference between pulse rise time and pulse fall time, the time difference between a 50-percent point in a pulse rise and a 50-percent point in a pulse fall, and so on.

The flow 200 includes editing detection of a second set of further strobe occurrences 230 based on the frequency of a second sequence of strobes. As was the case for the first sequence of strobe occurrences, editing detection can occur for the second sequence of strobes. Editing detection can edit out a time window for sensing by the infrared sensor of a gunshot sensor. During the time window that is edited out, the infrared sensor can ignore infrared pulses that can be associated with a second fire alarm strobe. The time window that is edited out can be less than or equal to four percent of a time period between strobe occurrences of the second sequence of strobes. In embodiments, the occurrence rate of a first sequence of strobes and the occurrence rate of a second sequence of strobes are substantially similar. When the these are substantially similar, the infrared sensor can see the two fire alarm pulses as one pulse, as a pulse wider than a pulse from a single strobe, and so on. In further embodiments, the first sequence of strobe occurrences and the second sequence of strobes are different. When the rate for the strobe occurrences of the first and second sequences of strobes are different, then the two sequences of strobes can be detected, where each sequence of strobes has its own frequency and duration. The editing detection can edit out time windows for sensing by the infrared sensor based on the multiple strobe frequencies and the multiple strobe durations. This concept can be extended to three, four, or more strobe sources with corresponding frequencies, durations, and editing. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
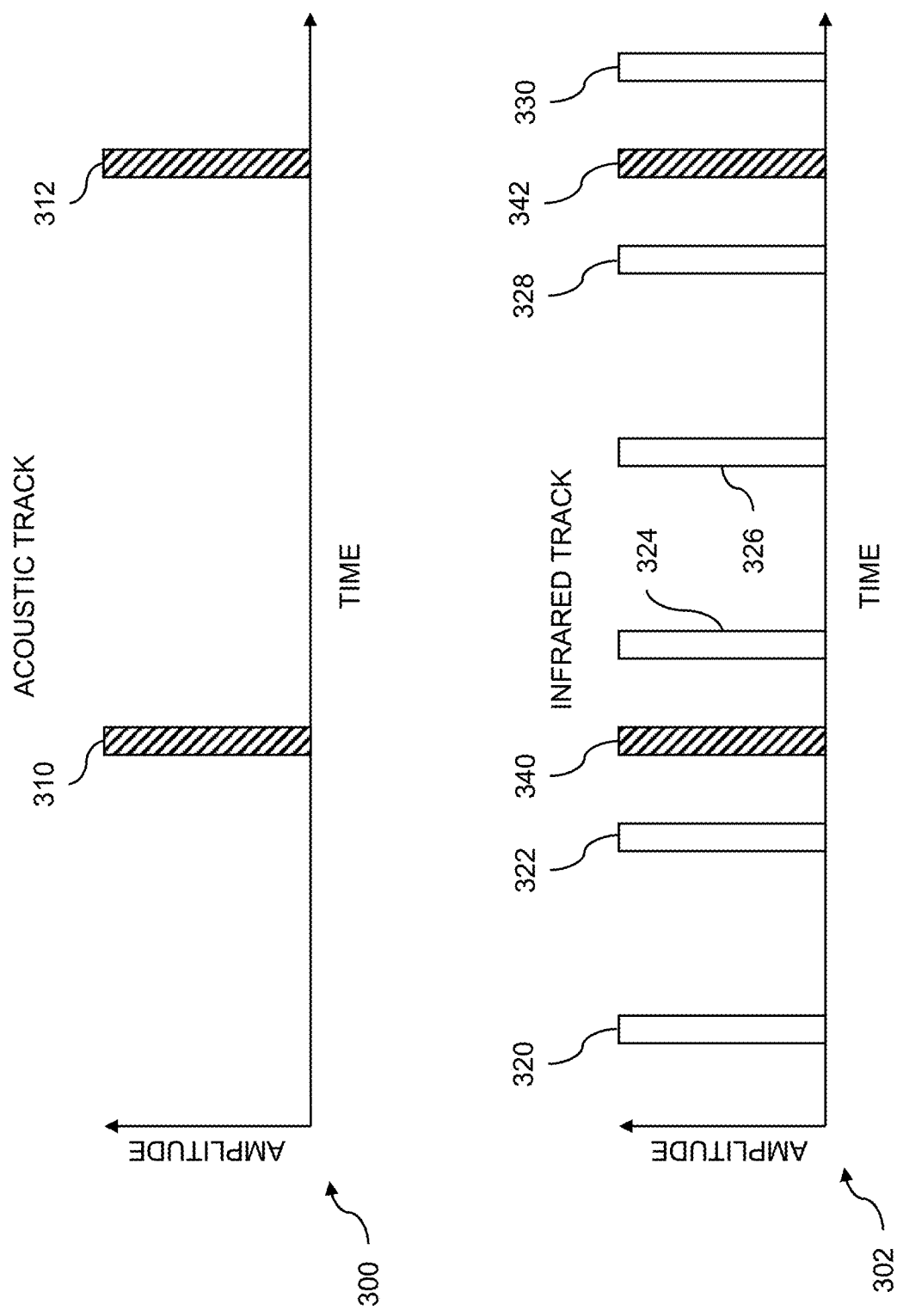
FIG. 3 is an example illustrating infrared and acoustic tracks.

FIG. 3 is an example illustrating infrared and acoustic tracks. As stated above, a gunshot sensor includes an infrared sensor and an acoustic sensor. In the event of a gunshot, the gunshot detector can detect an infrared pulse and can detect an acoustic pulse. The infrared sensor can detect an optical flash at the muzzle of a firearm, and the acoustic sensor can detect the muzzle blast and might detect a shockwave when the projectile expelled from the firearm is traveling at supersonic velocities. For a gunshot event, both an infrared event and an acoustic event can occur.

An example acoustic track 300 is shown. In the event of one or more gunshot events, the acoustic sensor can detect high sound-pressure level waves 310 and 312. An impulse can result for each gunshot event that occurs. An infrared track 302 is shown. Infrared pulses can result from a high intensity light strobe such as the strobe coupled to a fire alarm. Such pulses corresponding to a strobe occurrence can include pulses 320, 322, 324, 326, 328, and 330. Infrared pulses can result from an optical flash at the muzzle of a firearm. Such pulses corresponding to an optical flash can include pulses 340 and 342. The infrared track 302 shows that infrared pulses alone do not distinguish between a strobe occurrence and an optical flash. A gunshot can be detected, while the fire alarm is occurring, based on information from the infrared sensor and the acoustic sensor. As shown by track 300 and 302, the overlap between the acoustic track pulses is associated with one or more gunshots, and the overlap between the infrared track pulses is associated with the gunshots. That is, the coincidence of the acoustic track pulses and the infrared track pulses can be used to detect a true gunshot. Conversely, when there is not a pulse on the acoustic track that corresponds to a pulse on the infrared track, then the source of the infrared pulse is likely not a gunshot. The acoustic sensor can determine an absence of an acoustic pressure wave corresponding to a gunshot during a timeframe of the strobe occurrence.

Figure 4:
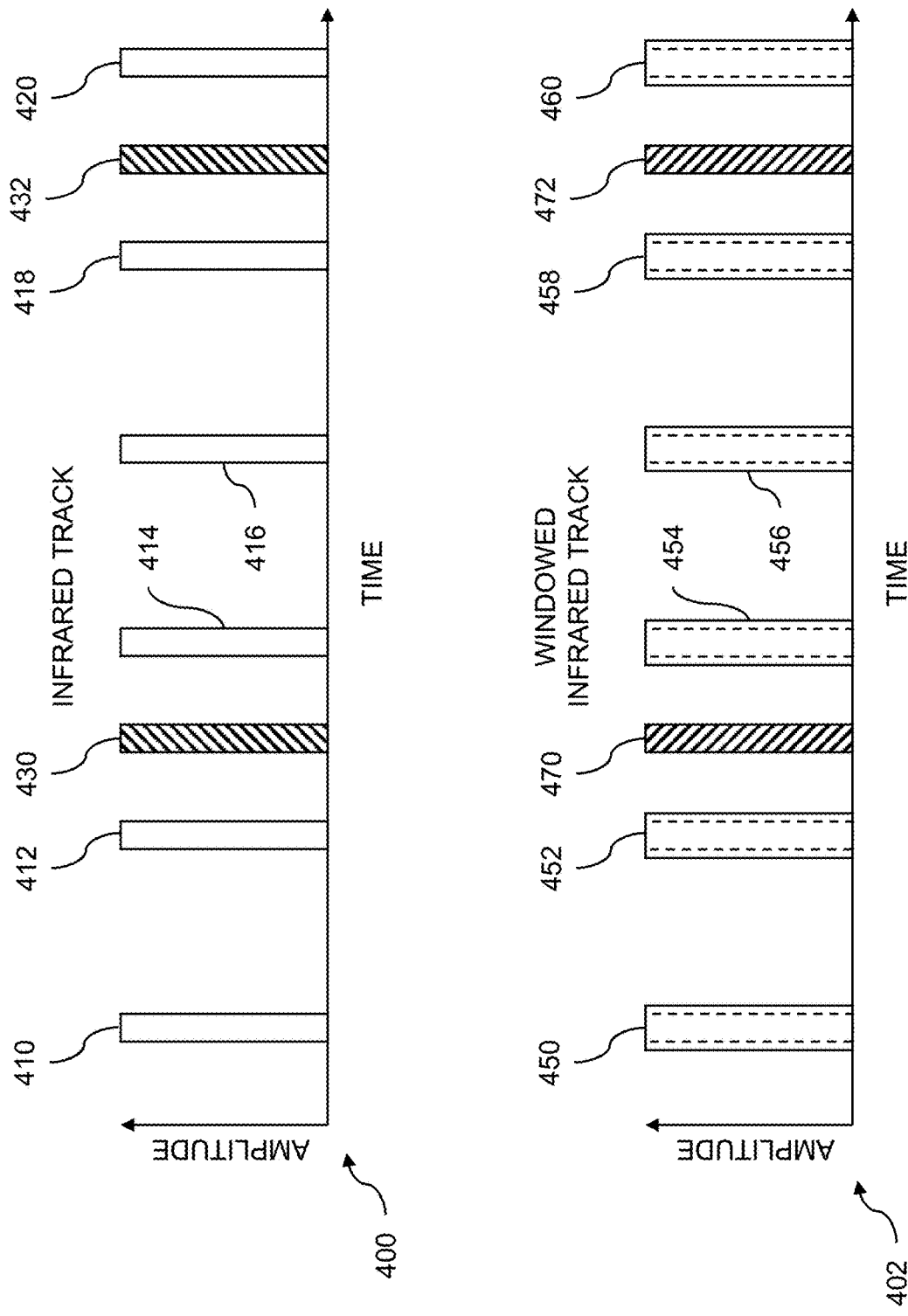
FIG. 4 is an example showing infrared and windowed infrared tracks.

FIG. 4 is an example showing infrared and windowed infrared tracks. Gunshot detection analysis can use a gunshot sensor to detect an infrared pulse, where the gunshot sensor can include an infrared sensor and an acoustic sensor. The infrared pulse can be determined to correspond to a strobe occurrence. A gunshot can be evaluated to have not occurred based on the strobe occurrence. A frequency of strobe occurrences can be determined, as can a duration for the strobes within the strobe occurrences. Editing detection can edit out a time window for sensing by the infrared sensor. An infrared track 400 is shown. As time progresses, a train of infrared pulses at the same amplitudes or at differing amplitudes can occur, where the pulses can correspond to strobe occurrences from a strobe. The strobe can be associated with an ongoing fire alarm. In the example 400, using a gunshot sensor to detect an infrared pulse can detect an infrared pulse corresponding to a strobe. The strobe occurrence can be part of a sequence of strobes. Pulses 410, 412, 414, 416, 418, and 420 can correspond to such a sequence of strobes. An infrared pulse can correspond to one or more gunshots, represented by pulses 430 and 432. A frequency of strobe occurrences can be determined by detecting a train of pulses, determining the period of time between pulses, and inverting the period to find frequency. The duration of strobes within the strobe occurrences can be determined. The duration of strobes can be determined by calculating the time difference between time at which a pulse rises and the time at which a pulse falls. Pulse duration can be measured between the 50-percent points of the rising waveform and the falling waveform, etc.

By determining a frequency and duration of strobe occurrences for a sequence of strobes, editing detection of the set of strobe occurrences can take place. The editing detection is based on the frequency and duration of the sequence of strobes. A windowed infrared track 402 is shown. The editing detection edits out a time window for sensing by the infrared sensor. During the edited time window, pulses resulting from infrared signals detected by the gunshot detector can be ignored. By ignoring signals, processing and analysis resources can be reserved for analyzing other signals that have not yet been identified, or signals that have been identified and are being tracked. The edited time window can be less than or equal to four percent of a time period between strobe occurrences. The small edited time window can avoid missing infrared pulses that might actually be gunshots. Based on the frequency of strobe occurrence for the sequence of strobes, or pulses 410, 412, 414, 416, 418, and 420, the strobes from the sequence can be edited as strobes, represented by pulses 450, 452, 454, 456, 458, and 460. Since the infrared pulses 430 and 432 can correspond to gunshot events, the pulses 430 and 432 can be left unedited as pulses 470 and 472, respectively.

Figure 5:
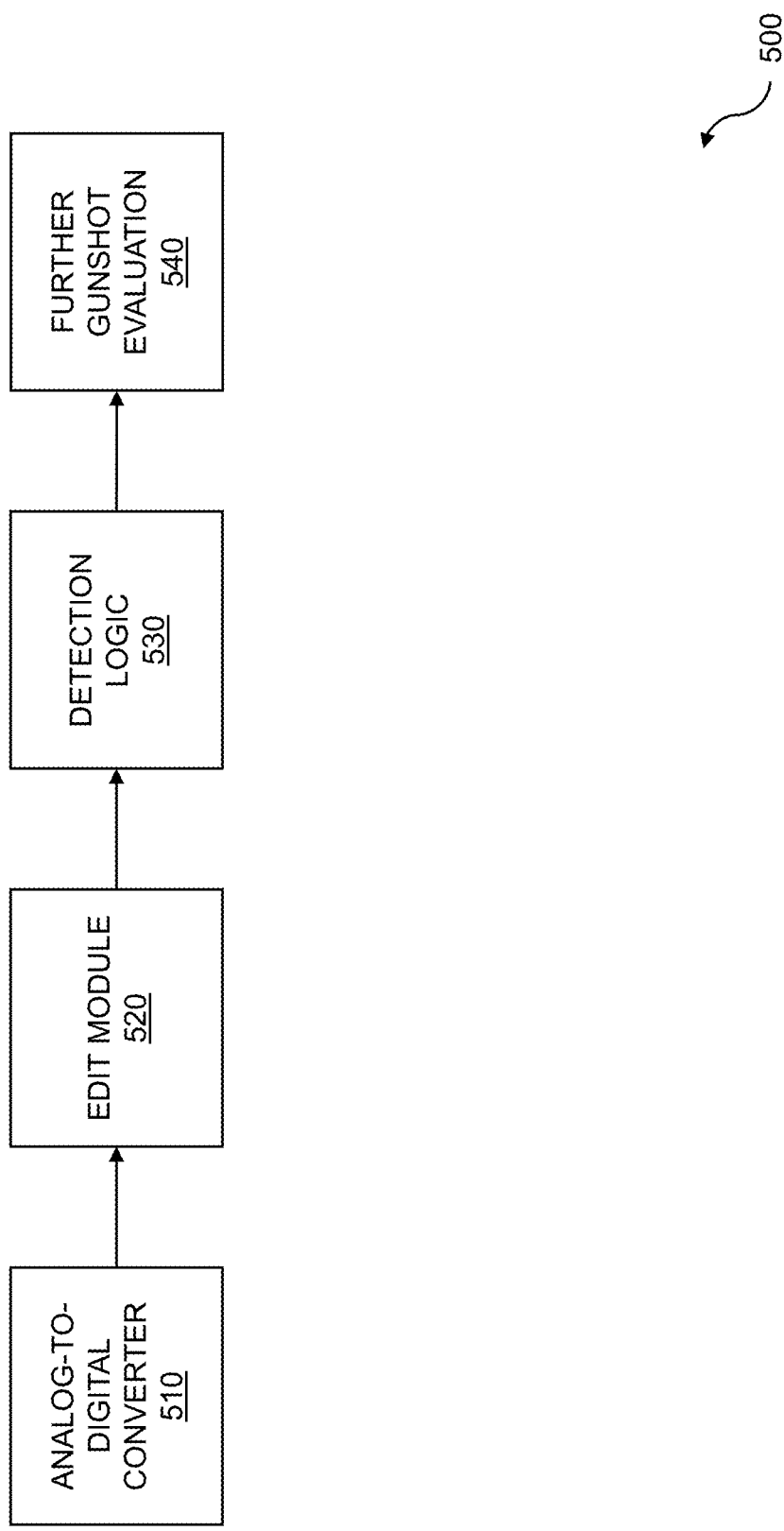
FIG. 5 is an example illustrating signal editing components.

FIG. 5 is an example illustrating signal editing components. Gunshot detection analysis can use a gunshot sensor to detect an infrared pulse, where the gunshot sensor can include an infrared sensor and an acoustic sensor. The example 500 shows signal editing components for indoor gunshot detection analysis with an ongoing fire alarm. The signal editing components can be included in a gunshot sensor or can be external to the gunshot sensor. The signal editing components can be implemented in hardware, software, or a combination thereof. The signal editing components can include a processor and software to configure the processor. The signal editing components can be implemented with integrated circuits, can be cloud-based, and so on. The gunshot sensor can include an analog-to-digital converter 510 and logic to perform gunshot detection, and the analog-to-digital converter 510 can be interposed between the infrared sensor and the logic. The logic can be edit logic. The analog-to-digital converter can operate on the impulses received from the infrared sensor or sensors and can operate on the impulses received from the acoustic sensor or sensors. The analog-to-digital converter can perform various operations including pulse detection, filtering, determining pulse frequency, determining pulse duration, and so on.

The analog-to-digital converter can be coupled to an edit module 520. As stated throughout, editing can include editing detection, where editing detecting can edit out a time window for sensing by the infrared sensor. The editing can be based on a frequency of strobe occurrences, on a duration of strobes within the strobe occurrences, and so on. The editing detection can be accomplished between the analog-to-digital converter and the logic to perform gunshot detection. The signal editing components can include detection logic 530. The detection logic 530 can be coupled to the edit module 520. The logic to perform gunshot detection can include a processor, as well as software to configure the processor to perform the gunshot detection. The gunshot detection can determine that an infrared pulse corresponds to a strobe occurrence and can evaluate whether a gunshot did or did not occur. The detection technique can be edited. The editing detection can be accomplished by the processor based on software to configure the processor to perform the editing. The editing detection can include loading software, where the software can be coded to implement a variety of algorithms, heuristics, and so on. The editing can be performed before the gunshot detection. The editing can include filtering, signal shaping, scaling, attenuation, discrimination, antialiasing, and so on. The signal editing components can include further gunshot evaluation 540. The further gunshot evaluation component 540 can be coupled to the detection logic 530. The further gunshot evaluation can include detecting a gunshot with an ongoing fire alarm, detecting a gunshot with multiple ongoing fire alarms, detecting multiple gunshots, etc. The further gunshot evaluation can include identifying weapons, identifying shooters, tracking shooters, and so on. Various embodiments of the example 500 illustrating signal editing components can be included in a computer program product embodied in a non-transitory computer readable medium that includes code executable by one or more processors.

Figure 6:
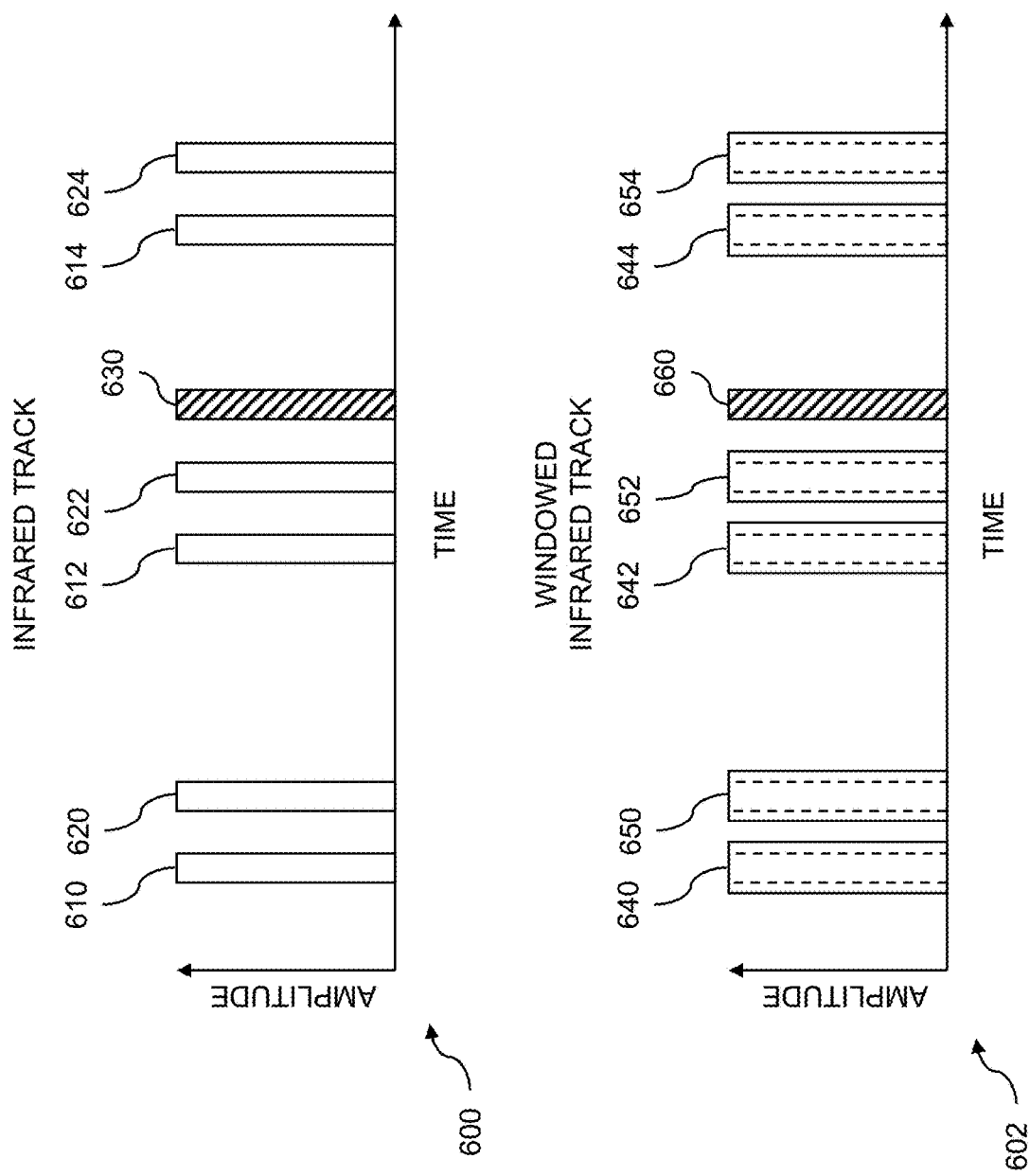
FIG. 6 is an example showing editing for multiple strobes.

FIG. 6 is an example showing editing for multiple strobes. In the presence of multiple strobes, editing detection can edit out multiple time windows for sensing by the infrared sensor. An infrared track 600 is shown. As time progresses, a train of infrared pulses at the same amplitudes or at differing amplitudes can occur that can correspond to strobe occurrences from one or more strobes. The example of strobe occurrences from a single fire alarm strobe is discussed above. In the example 600, using a gunshot sensor to detect an infrared pulse can detect a second infrared pulse corresponding to a second sequence of strobes. Pulses 610, 612, and 614 can correspond to strobe occurrences of a first strobe, and pulses 620, 622, and 624 can correspond to strobe occurrence of a second strobe. In practice, any number of strobe occurrences can be present. An infrared pulse can correspond to a gunshot, represented by pulse 630. As was the case for a single strobe, where a frequency of strobe occurrences for the first sequence of strobes was determined, a frequency of strobe occurrences for the second sequence of strobes can also be determined. The results of determining a frequency of strobe occurrences for a second sequence of strobes can be editing detection of a second set of further strobe occurrences based on the frequency of second sequence of strobes. A windowed infrared track 602 is shown. Based on the frequency of strobe occurrence for the first sequence of strobes, represented by pulses 610, 612, and 614, the strobes from the first sequence can be edited to pulses 640, 642, and 644, respectively. Similarly, based on the frequency of strobe occurrence for the second sequence of strobes, represented by pulses 620, 622, and 624, the strobes from the second sequence can be edited to pulses 650, 652, and 654, respectively. Since the infrared pulse 630 can correspond to a gunshot event, the pulse 630 can be left unedited as pulse 660.

Editing detection to edit out a time window for sensing by the infrared sensor infrared pulses corresponding to the first sequence of strobe occurrences, and editing detection to edit out a time window for sensing by the infrared sensor infrared pulses corresponding to the second sequence of strobe occurrences, can be dependent not only on the frequencies of the first sequence of strobe occurrences and the second sequence of strobe occurrences, but also on the durations of each sequence of strobe occurrences and the separation between the two sequences. Frequencies for a first sequence of strobe occurrences and frequencies for the second sequence of strobes can be substantially similar. Differentiating between the two sequences can be complex since it can be difficult to differentiate between the beginning of one pulse in one sequence and the ending of another pulse in another sequence. When the pulse frequencies are substantially similar, the editing can be accomplished by increasing the value of the duration for strobes within the first sequence of strobe occurrences, such that the increased duration value covers both the first sequence of strobe occurrences and the second sequence of strobe occurrences. However, frequencies for the first sequence of strobe occurrences and frequencies of the second sequence of strobes can also be different. In this latter case, detection of strobe occurrences of the first sequence of strobes and detection of strobe occurrences of the second sequence of strobes can differentiate between the two sequences of strobes. The widths of the editing windows can thus be determined individually based on the durations of the two sequences of pulses.

Figure 7:
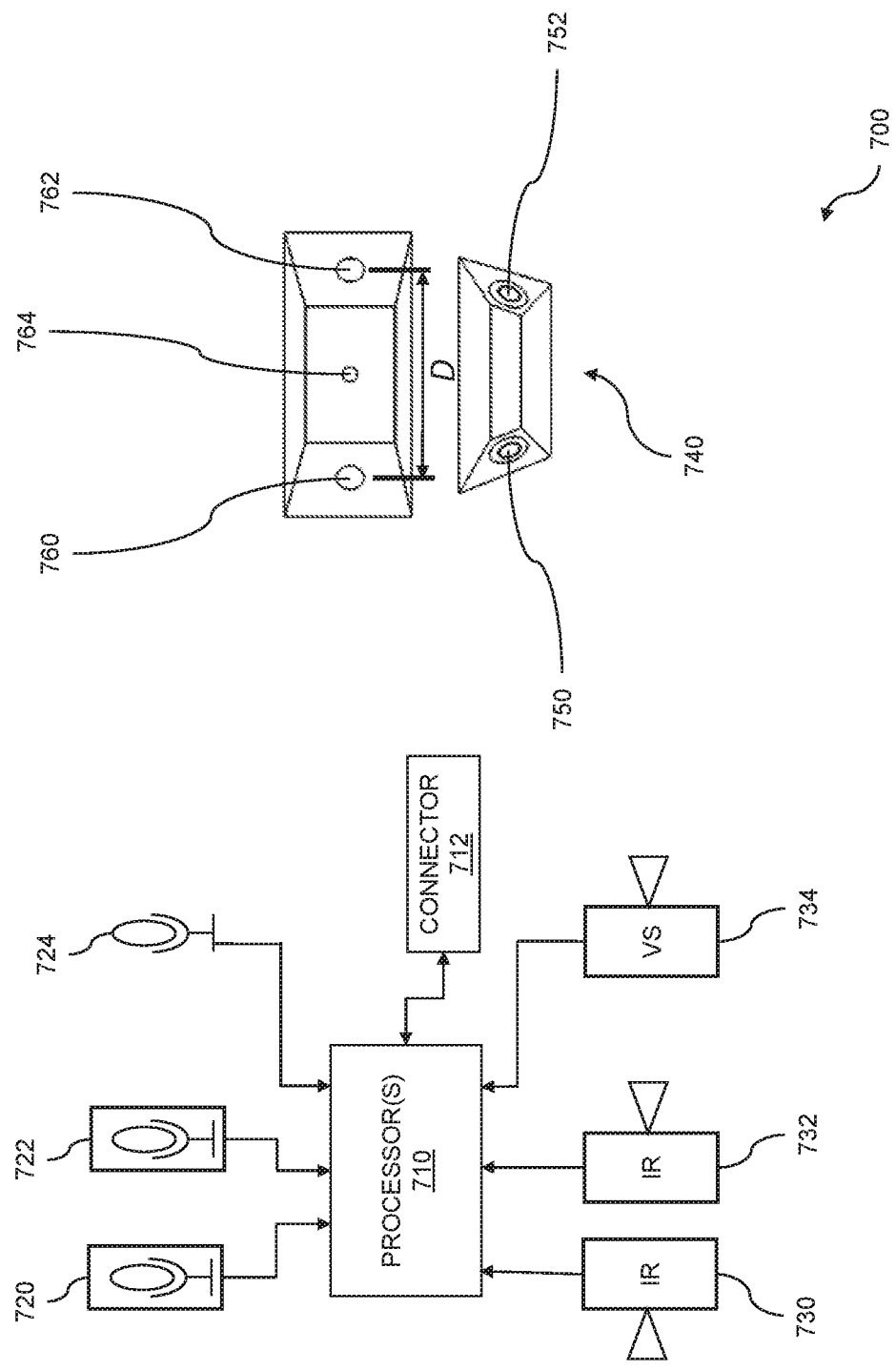
FIG. 7 is an example illustrating a gunshot sensor unit.

FIG. 7 is an example illustrating a gunshot sensor unit 700 for indoor gunshot detection analysis. A sensor can include one or more processors 710, two infrared sensors 730 and 732, two acoustic sensors 720 and 722, and a microphone 724. The infrared sensors 730 and 732 can be used to obtain infrared information, where the infrared information can include a muzzle flash, a flash from an explosion, etc. The acoustic sensors 720 and 722 can be used to detect sound pressure levels (SPL) events, where the sound pressure levels of the events can be compared to the SPLs of muzzle blasts from gunfire, explosions, and other events. The microphone 724 can be activated based on detecting a gunshot. The microphone 724 can be used for tracking a suspected shooter. The microphone can be activated for a limited period of time. More than two infrared sensors or acoustic sensors can be included in the gunshot sensor unit 700.

An image of an example sensor 740 is shown. The sensor 740 can include infrared sensors 750 and 752, acoustic sensors 760 and 762, and a microphone 764. The sensor can also include video cameras and an analyzer. The analyzer can be used to detect a gunshot in an indoor environment based on the infrared information and the acoustic information. The acoustic sensors 760 and 762 can be oriented at different angles and spaced apart by a distance D. In some embodiments, the distance D is 1.25 inches. Since a shock wave from a bullet is directional, one of the acoustic sensors (e.g. 760) might detect the shock wave while the other sensor (e.g. 762) might not. This information can be used as part of a forensics analysis to estimate the trajectory of a fired projectile/bullet. Similarly, the IR sensors 750 and 752 can also be disposed at different angles to increase the area of detection coverage. While one configuration of IR sensors, acoustic sensors, and a microphone is shown, other embodiments can include difference numbers and configurations of the IR sensors, acoustic sensors, and the microphone. In other embodiments, additional IR sensors, acoustic sensors, microphones, video sensors, and processors can be present in the sensor. In some embodiments, a visual sensor 734 is included for flash detection that can evaluate a component of visible light. The visual sensor 734 can be used in addition to the infrared sensor. The visual sensor flash detector can be used in the determining that the infrared pulse corresponds to a strobe occurrence. The infrared detector can detect an infrared pulse and the flash detector can detect a visible light flash. When the infrared pulse corresponds to a significant visible light component then a strobe can have occurred rather than a gunshot.

In embodiments, the gunshot sensor includes a second infrared sensor 732 and a second acoustic sensor 722. The infrared sensors 730 and 732 can be used to obtain infrared information, where the infrared information can include a muzzle flash, a flash from an explosion, heat from a flame, strobes from a fire alarm, etc. The infrared sensors and the second infrared sensor can be pointed to cover different fields of view. The information collected from the different fields of view can be used to determine a direction to a gunshot event, distance to a gunshot event, and so on. The information collected from the different fields of view can also be used for tracking shooters, combatants, etc. The acoustic sensors 720 and 722 can be used to detect sound pressure levels events, where the sound pressure levels of the events can be compared to the SPLs of muzzle blasts from gunfire, explosions, and other events. The acoustic sensor and the second acoustic sensor cannot detect voices (unless specifically enabled under certain conditions), which can be useful for maintaining confidentiality, security, and so on during everyday situations. The gunshot sensor can include a connector 712 where the gunshot sensor is coupled to a gunshot detection system. The gunshot sensor can notify the gunshot system that a fire alarm has been detected and the algorithm on which the other gunshot sensors evaluate gunshot detection can be modified for better editing of strobes. The connector 712 can also be connected to a fire alarm system so that the gunshot sensor is aware that a fire alarm is active and thereby modify the editing of the IR impulses being received for better gunshot detection in the periods of time during which the strobe pulse is not active. In some embodiments, the connector 712 is accomplished using wireless technology.

The gunshot sensor can include video cameras and an analyzer. The analyzer can be used to detect a gunshot in an indoor environment based on the infrared and acoustic information. In embodiments, the analyzer is implemented by code executing on the one or more processors 710. The analyzer can perform video analytics based on video collected from the video cameras. The video analytics can track a suspected shooter of the gunshot using the video that was collected. While one configuration of IR sensors, acoustic sensors, and a microphone is shown, other embodiments include different numbers and configurations of the IR sensors, acoustic sensors, and the microphone. In other embodiments, additional IR sensors, acoustic sensors, microphones, video sensors, and processors are present in the gunshot sensor. In some embodiments, the sensor 740 is sized to fit into a standard 4×4 inch opening such as an opening used for a double light switch or a double electrical receptacle. In this way, gunshot sensors of disclosed embodiments are easily installed within existing infrastructure. Thus, the gunshot sensor can comprise an infrared sensor and an acoustic sensor. Furthermore, the gunshot sensor can further comprise a second infrared sensor and a second acoustic sensor. The infrared sensor and the second infrared sensor can be pointed to cover different fields of view. The acoustic sensor and the second acoustic sensor can be configured to not detect voices. The acoustic sensors can be configured to detect shock waves, and/or very loud sounds (e.g. 130 decibels or higher).

Figure 8:
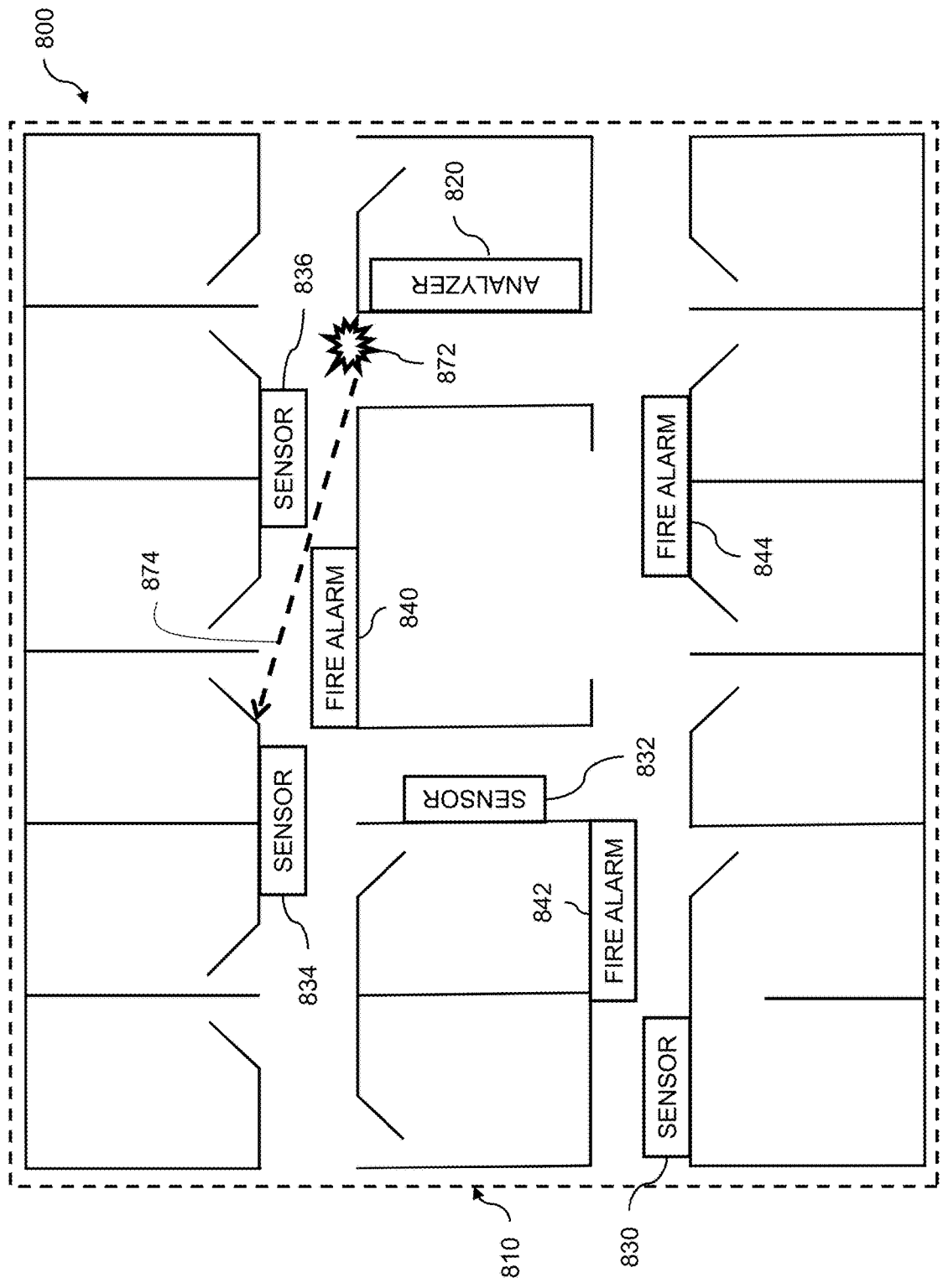
FIG. 8 is an example showing an indoor sensor configuration.

FIG. 8 is an example showing an indoor sensor configuration. Sensors, analysis systems, and fire alarms can be deployed within a space 800. An example floorplan 810 is shown which includes rooms, hallways, open spaces such as lounges and meeting rooms, and so on. The floorplan 810 can include deployed sensors 830, 832, 834, and 836, fire alarms 840, 842, and 844, and an analyzer, or gateway, 820.

The sensors 830, 832, 834, and 836 can be gunshot sensors, where the gunshot sensors are deployed within an environment such as an indoor environment. The gunshot sensors can include an infrared sensor and an acoustic sensor. The gunshot sensor units can include other sensor types, such as a visual sensor including a flash detector, an audio microphone, and so on. The infrared sensors can be used to detect a muzzle flash, a strobe from a fire alarm, etc. The acoustic sensors can detect sound events with various sound pressure levels. In embodiments, the gunshot sensors include visual band light detectors. These visual band light detectors can be used to evaluate when a strobe occurs and differentiate between a strobe and a gunshot. The infrared sensors, the acoustic sensors, and other sensors if present, can be used to determine a direction of a gunshot, the distance to the gunshot, the type of weapon and so on.

The fire alarms 840, 842, and 844 can include a visual module, such as a strobe, and a sounder module, which can be used for conveying alarms, messages, codes, etc. The fire alarm strobe can include infrared light spectra, visible light spectra, and so on. The sounder can produce high sound-pressure levels. The infrared light pulses that can be detected from the strobe occurrences can be similar to infrared light pulses that can be detected from muzzle flashes resulting from gunshots. The analyzer 820, or gateway, can use the gunshot sensors 830, 832, 834, and 836 to determine that a detected infrared pulse corresponds to a strobe occurrence. The infrared pulses that are detected can be received from multiple fire alarms. For example, the sensor 830 has a line of sight to the fire alarm 842 and the fire alarm 844 and can receive infrared pulses corresponding to strobes from the fire alarms 842 and 844. Other sensors might have lines of sight to these and/or other fire alarms. The analyzer 820, or gateway, can aggregate information from the various sensors and aid the sensors in distinguishing between strobes and gunshots. The analyzer 820 can provide information to the gunshot sensors to enable the sensors into an editing mode, thereby decreasing false detects (or false alarms) of gunshots. The analyzer 820, or gateway, can evaluate that a gunshot occurred based on the strobe occurrence. As discussed above, when an infrared pulse occurs without a high sound-pressure level impulse, then the infrared pulse can be determined to correspond to a strobe occurrence. The analyzer 820, or gateway, can evaluate that when an infrared pulse occurs corresponding to a high sound-pressure level impulse, then the infrared pulse can be determined to correspond to a gunshot event. The information can be provided to a gunshot detection system, from the gunshot sensor, that a fire alarm can be occurring based on the strobe occurrence. Such information can be used to edit detection of further strobe occurrences so that the processor can search for gunshot events and ignore fire alarm strobe occurrences. Communication can occur among the sensors and the fire alarms, such as sensors 830, 832, 834, and 836, and the fire alarms 840, 842, and 844. In embodiments, communication includes communicating between a fire alarm system and a gunshot detection system, including the gunshot sensor, so that the fire alarm system can provide a fire alarm notification to the gunshot detection system of a fire alarm and can further evaluate that a gunshot did not occur based on the fire alarm notification. Such communication can reduce computational loads on the analyzer 820, or gateway, by eliminating the need to detect and track fire alarm strobe occurrences, and instead concentrate on gunshot detection.

In the space 800, for example, a gunshot is fired at location 872, causing a projectile trajectory as indicated by path 874. In this situation, the gunshot sensor 836 is closest to the path 874. As the projectile/bullet passes by the sensor 836, a shock wave from the projectile is received by the acoustic sensors within the gunshot sensor 836. In the case of a gunshot sensor unit such as the sensor 740 of FIG. 7, acoustic sensors are spaced apart by a distance D. In this configuration, each acoustic sensor within the gunshot sensor receives the shock wave at a slightly different time. This difference in time can be used to infer information about the gunshot, such as the approximate direction from which the projectile was fired, and/or the approximate speed of the projectile.

The gunshot sensors can be deployed throughout an indoor space. The indoor space can include rooms such as hotel rooms, hospital rooms, and classrooms, hallways, common areas such as lounges, meeting rooms, and lobbies, gymnasiums, cafeterias, stairwells, restrooms, and so on. The gunshot sensors therefore can be used to determine that a gunshot event has occurred and this occurrence can be determined independent of specific position. Thus the gunshot sensors do not require knowledge of their position and the gunshot detection system does not require knowledge of the specific locations of the sensors. The goal of gunshot detection analysis is to accurately detect that a gunshot has occurred.

Environmental and manmade sources can confound the infrared sensor and the acoustic sensor because the environmental and manmade sources can produce infrared signals and acoustic signals that are similar to those produced by gunshot events. An example of an environmental signal source is a reflected flash of sunlight off a moving vehicle, mirror, or other shiny object. An example of a manmade source is a strobe. Strobes are ubiquitous and are used to serve many purposes including emergency and danger warnings, alerts, and so on. Strobes are commonly deployed in buildings for purposes such as fire alarms and other warning systems, and are routinely displayed on vehicles such as emergency vehicles, forklifts, transport vehicles, carts, heavy equipment, school buses, dangerous equipment, and so on. Other common uses of strobes include specialty lighting with uses for photography, public gathering places (e.g. dance clubs), halogen lights, etc. A strobe flash contains visible light spectra and can "bleed over" into other spectra, including infrared. It is this bleed over into infrared that can cause a false gunshot detection. In embodiments, analysis can be performed to detect that a number of strobes have occurred and that these occurrences create a problem for gunshot evaluation. In some cases, an environment cause can be determined and changes to the environment can be recommended. For instance, a gunshot sensor can be moved so that it does not pick up reflected sunlight from cars parked in a nearby parking lot that is visible through a window in a building. Other similar changes can be recommended to for the gunshot sensors or for the surrounding environment.

Figure 9:
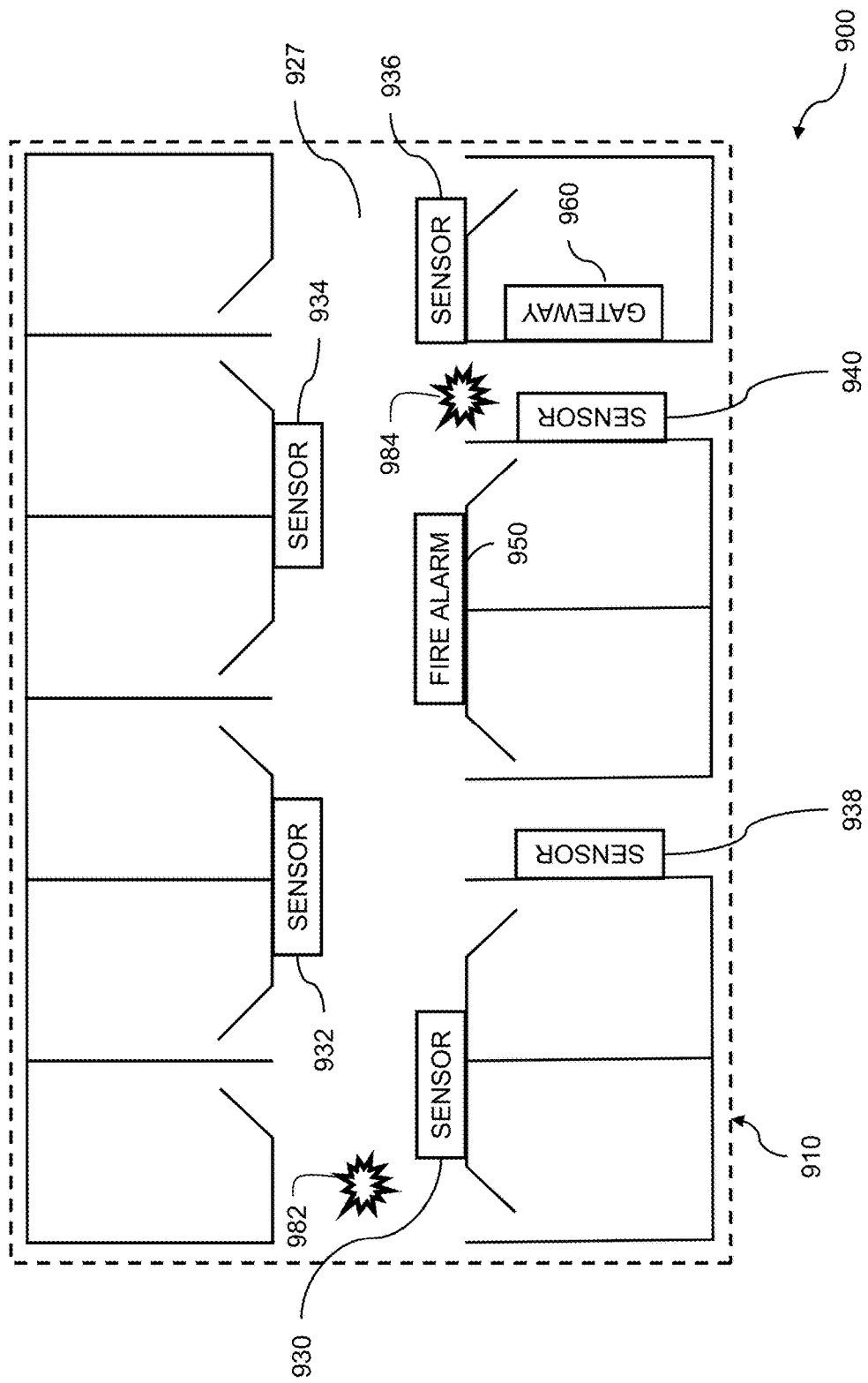
FIG. 9 is an example indoor sensor configuration in a hallway.

FIG. 9 is an example indoor sensor configuration in a hallway. The indoor area 900 has a perimeter 910 and comprises a long hallway 927. A plurality of gunshot sensors 930, 932, 934, 936, 938, and 940 are installed at various positions within the area 900. A fire alarm 950 is installed within the area 900. A gateway, or analyzer, 960 is installed within the area 900 and is configured to receive inputs from the plurality of gunshot sensors 930, 932, 934, 936, 938, and 940. In embodiments, the gateway 960, or analyzer, also receives input from the fire alarm 950. In such embodiments, when a fire alarm is activated, information pertaining to the time and duration of each strobe and/or buzzer activation of the fire alarm is communicated to the gunshot sensors, such that the gunshot sensors can compensate for the active fire alarm. In some embodiments, the compensation includes utilization of windowing techniques. In this example, a first gunshot is fired at a location 982 and is primarily detected by the sensor 930. A second gunshot is later fired at a location 984 and is primarily detected by the sensors 940, 934, and 936. Information from each gunshot sensor is sent to the gateway 960, or analyzer, which can then perform analysis on the gunshot information and/or send the information to another system for further analysis. In embodiments, the gateway 960, or analyzer, sends the gunshot information to a server in the cloud via the Internet. In this way, assailants cannot damage or destroy the forensic evidence, even if they attempt to destroy equipment at the premises. Analysis in accordance with disclosed embodiments can correlate the IR signatures from the sensors 934, 936, and 940 to determine that the inputs received from the sensors 934, 936, and 940 all pertain to the same gunshot fired at the location 984, while the gunshot fired at the location 982 and detected primarily by the gunshot sensor 930 is a different gunshot event. Hence, disclosed embodiments are well suited for detecting multiple gunshots in an indoor environment, including an indoor environment comprising a long hallway, such as what is often found in a school.

Figure 10:
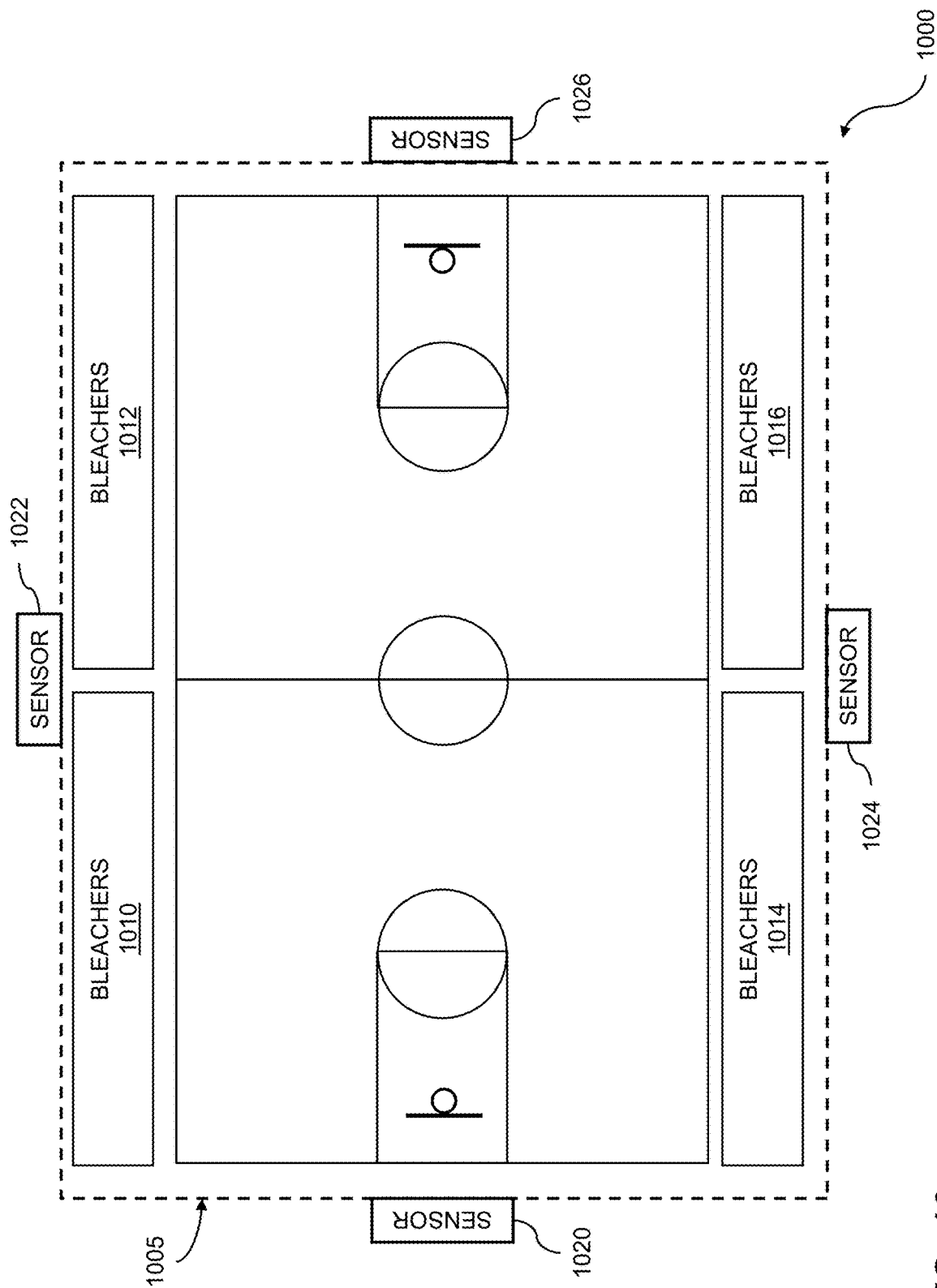
FIG. 10 is an example indoor sensor configuration with four sensors.

FIG. 10 is an example indoor sensor configuration with four sensors as installed in a gymnasium area. In such an embodiment, four gunshot sensors 1020, 1022, 1024, and 1026 are installed in an area 1000 with perimeter 1005. One gunshot sensor is installed on each wall of the gymnasium area to provide ample coverage of the area 1000. Loud noises from events such as closing or opening the bleachers 1010, 1012, 1014 and 1016 do not trigger false alarms with gunshot sensors of disclosed embodiments. Even though manipulating the bleachers can make loud noises, it does not generate shock waves or infrared signatures, and thus, disclosed embodiments discern that such activity does not result from gunshots.

Figure 11:
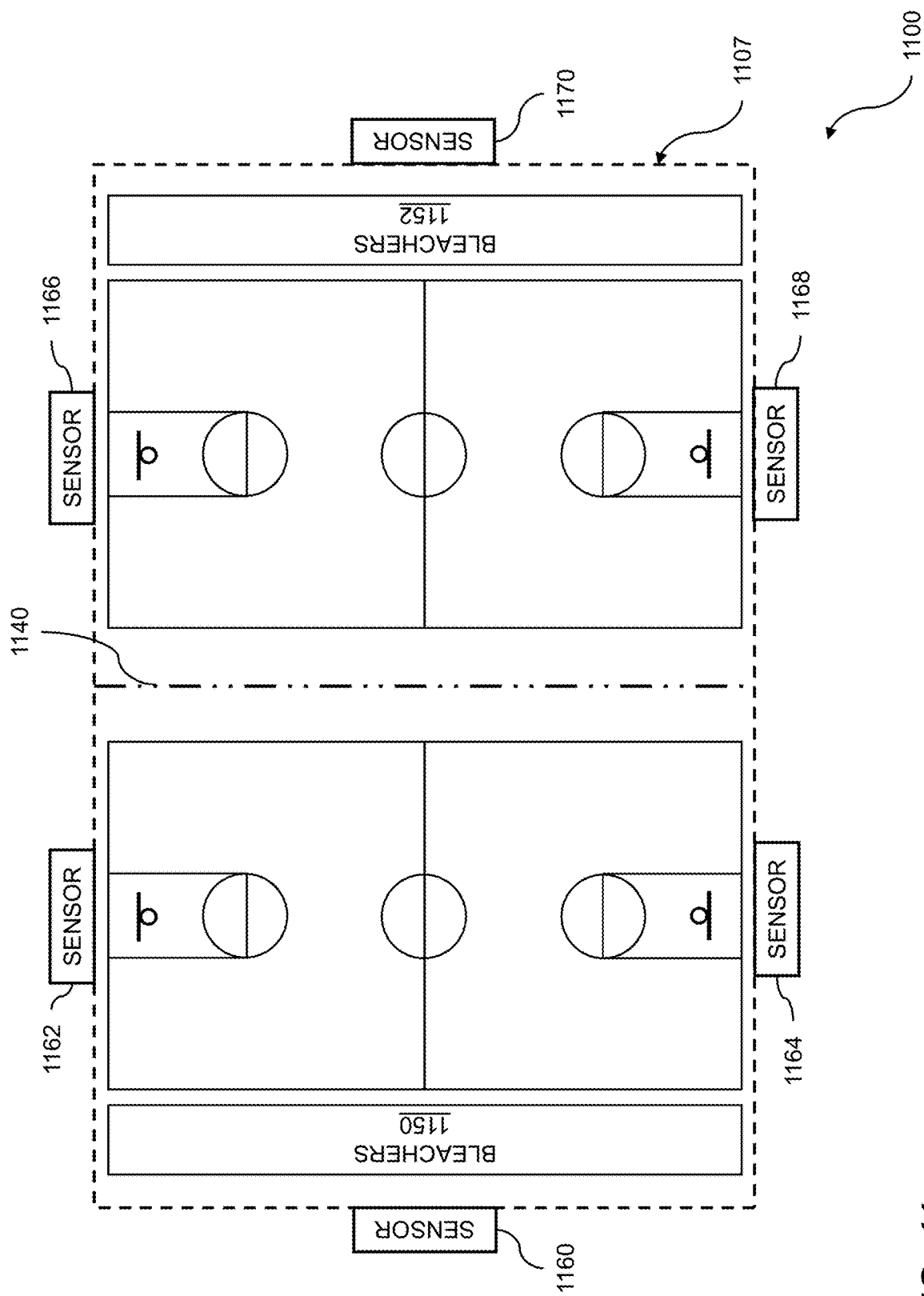
FIG. 11 is an example indoor sensor configuration with six sensors.

FIG. 11 is an example indoor sensor configuration with six sensors installed in a split gymnasium area 1100 with perimeter 1107. As is common in a school gymnasium, a partition wall 1140 can be extended to partition a gymnasium into two smaller areas. In such situations, a six gunshot sensor configuration can be used, including the gunshot sensors 1160 and 1170 on the shorter walls of the gymnasium, and the gunshot sensors 1164, 1168, 1162, and 1166 installed on the longer walls of the gymnasium. Loud noises from events such as closing or opening the bleachers 1150 and 1152 do not trigger false alarms with gunshot sensors of disclosed embodiments. Even though manipulating the bleachers can make loud noises, it does not generate shock waves or infrared signatures, and thus, disclosed embodiments discern that such activity does not result from gunshots.

Figure 12:
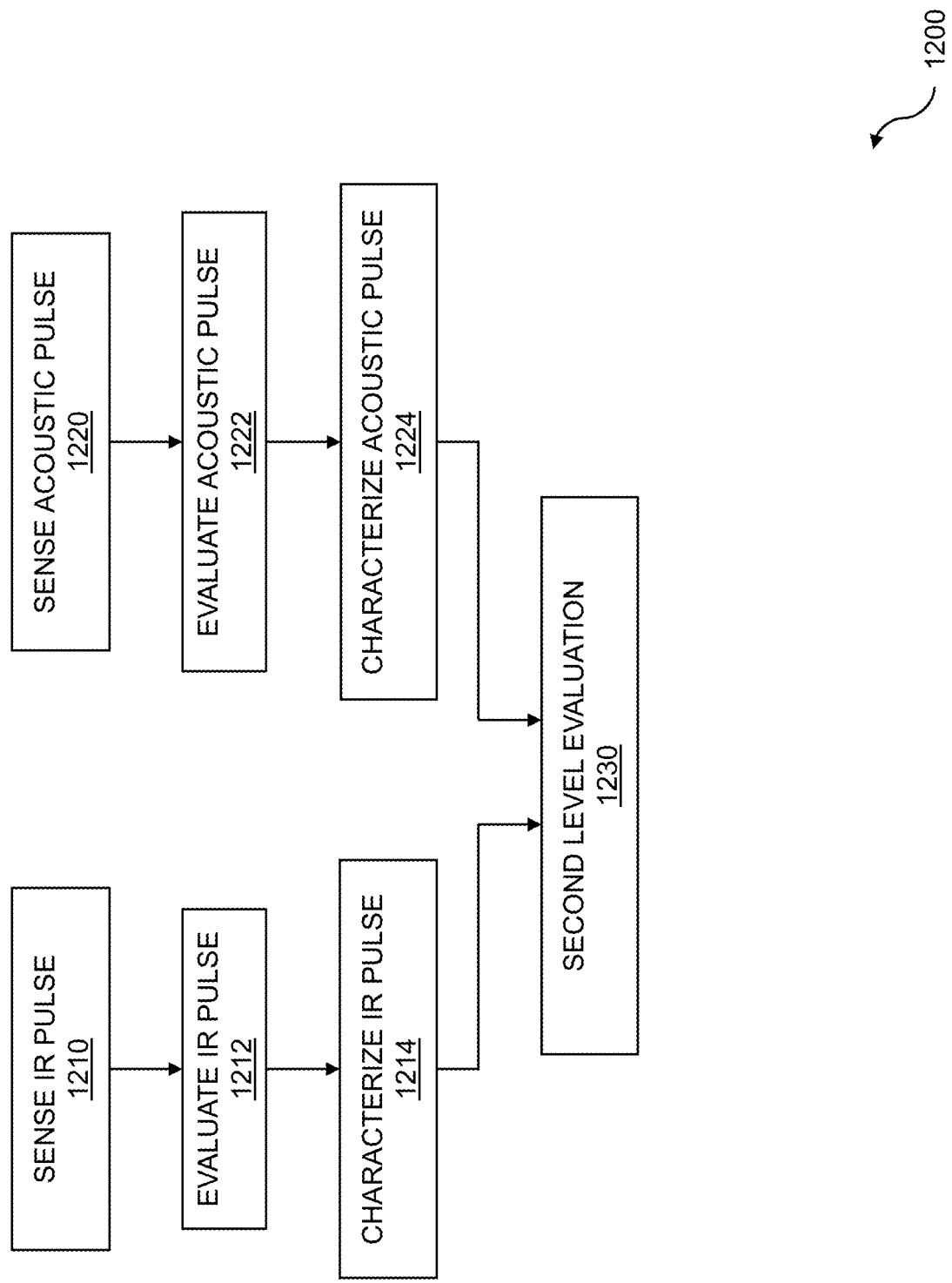
FIG. 12 is a flow diagram for signal analysis.

FIG. 12 is a flow diagram for signal analysis. The flow 1200 includes sensing an IR pulse 1210. In embodiments, the IR pulse has a duration ranging from about one millisecond to about twenty milliseconds. The duration can vary depending on the firearm. The flow 1200 continues with evaluating the IR pulse 1212. This can include determining peaks along different wavelengths within the range of IR acquisition. The flow 1200 continues with characterizing the IR pulse 1214. The characterizing can include identification of a particular peak and associating that peak with a known spectral signature from a firearm discharge.

The flow 1200 includes sensing an acoustic pulse 1220. The acoustic pulse can include a shock wave having a characteristic "N" shape that originates from the projectile, and/or a sound wave that originates from the firearm. The "N" shape is caused by a steep increase in sound pressure, followed by a somewhat slower negative depressurization to a minimum value, followed by another steep return to normal pressure. The acoustic pulse can occur in well under a millisecond. The flow 1200 includes evaluating the acoustic pulse 1222. This can include measuring a duration of the acoustic pulse. The flow 1200 includes characterizing the acoustic pulse 1224. The characterizing can include the identification of a particular acoustic pulse and associating that acoustic pulse with a known acoustic signature from a firearm discharge.

The flow 1200 includes performing a second level evaluation 1230. The second level evaluation comprises assembling results from one or more gunshot sensors. The flow 1200 can comprise assembling results from the gunshot sensor along with a second gunshot sensor in a gateway device. The assembling can be accomplished independent of the location for the gunshot sensor and the location for the second gunshot sensor.

In embodiments, the assembling includes computation of a gunshot score, based on multiple sensor inputs. The sensor inputs can include shock wave detection, sound wave detection, and infrared detection. Furthermore, in embodiments, the gunshot score G is computed as $G = K_1 f_1(S) + K_2 f_2(I) + K_3 f_3(N)$, where S is the shock wave information, I is the infrared information, and N is the sound wave information. The function $f_1$ returns a value based on the magnitude of the shock wave. The function $f_2$ returns a value based on the spectral signature of the infrared information. The function $f_2$ can include a correlation function and/or best-fit function for an infrared signature that resembles that from firearm discharge. The function $f_3$ returns a value based on the magnitude of a sound wave. $K_1$, $K_2$, and $K_3$ are constants. The constants can be set to give appropriate weight to each of the three inputs. When the gunshot score, G, exceeds a predetermined level, a gunshot is deemed to have likely occurred. A gateway device can report this information to upstream systems such as campus security systems, law enforcement systems, and the like.

Figure 13:
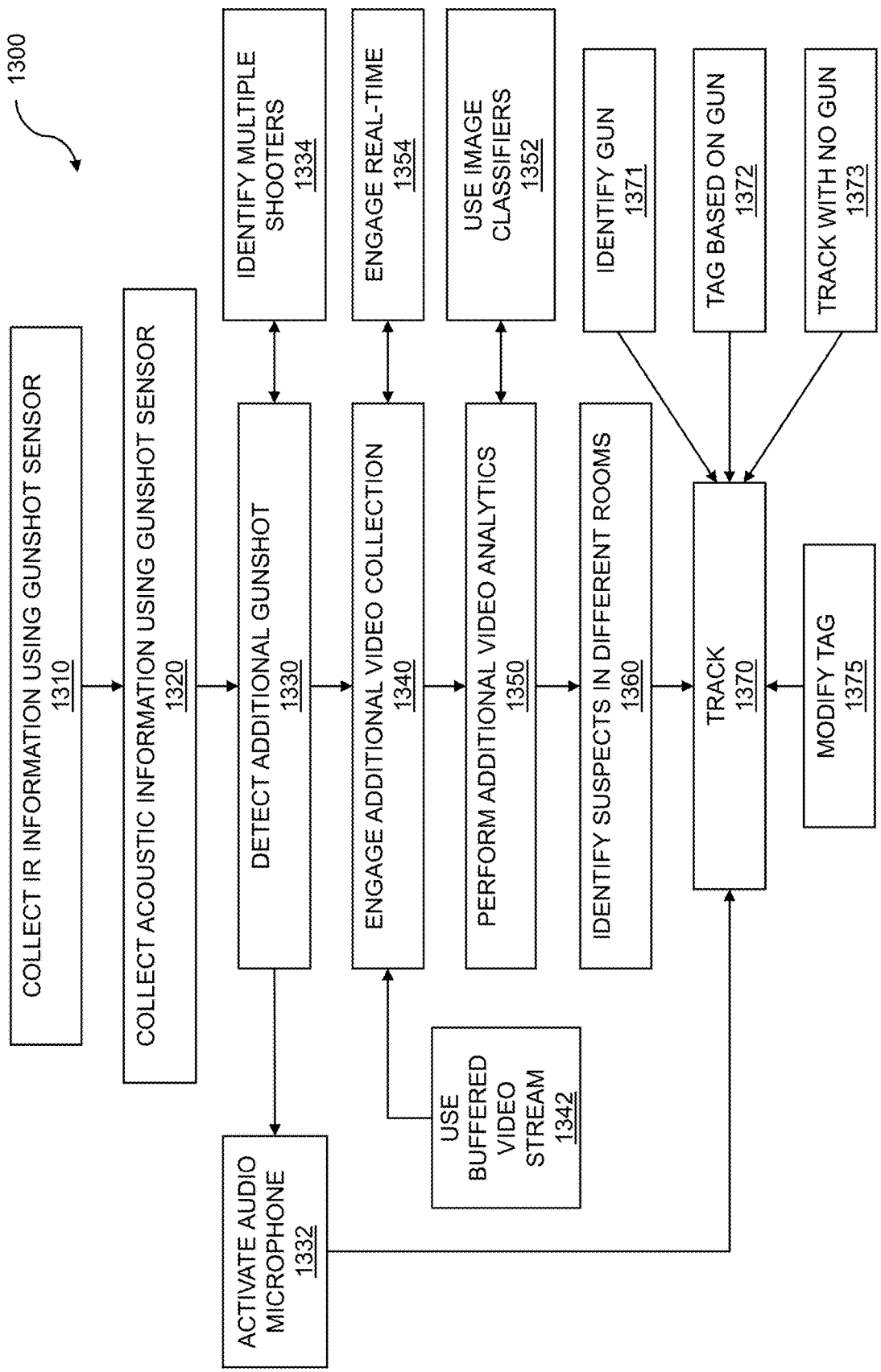
FIG. 13 is a flow diagram for additional gunshot analysis.

FIG. 13 is a flow diagram for additional gunshot analysis. The flow 1300 can comprise a processor-implemented method for gunshot analysis. Indoor gunshot detection can be based on infrared and acoustic information, where both types of information can be collected within an indoor environment. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that can be activated. After an initial gunshot detection, flow 1300 includes collecting subsequent IR information using a gunshot sensor 1310 in an indoor environment. The flow 1300 includes collecting subsequent acoustic information using a gunshot sensor 1320 in an indoor environment. The IR information collection 1310 and the acoustic information collection 1320 can occur simultaneously or near simultaneously on the same gunshot sensor. The IR and acoustic information collection can occur simultaneously or near simultaneously on multiple gunshot sensors.

The flow 1300 includes detecting an additional gunshot 1330. Gunshot analysis can further comprise detecting an additional gunshot, in the indoor environment, based on the infrared information and the acoustic information. The additional gunshot can be used to identify multiple shooters 1334. Engaging additional video collection can be based on the multiple shooters that were identified. The additional video collection can enable additional video analytics to be performed for tracking more than one suspected shooter. In embodiments, the more than one suspected shooter can be in different rooms. In other embodiments, the more than one suspected shooter can be in the same room. Different analytics can be employed to determine whether the suspected shooters are in the same or different rooms.

The additional gunshot can be used to identify multiple shooters. For example, if two shots occur in different rooms at nearly the same time, multiple shooters can be assumed. The additional gunshot can engage additional video collection 1340. The additional video collection can be engaged from one or more video streams from one or more video cameras or imagers. The additional gunshot can activate one or more audio microphones 1332. The video collection can use one or more buffered video streams 1342. The video collection can be engaged real-time 1354 to enable real-time, or near real-time, use of the video. The flow 1300 includes performing additional video analytics 1350. The additional analytics are performed on a different video stream or with a different video analysis objective than the initial analytics. The additional video analytics can use image classifiers 1352. The image classifiers can be used to identify characteristics about a gunshot event, a suspect shooter, and so on. The image classifiers can be used to identify a gun or a gun type. For example, the image classifiers can be used to identify a gun type such as a revolver, a semi-automatic handgun, etc., and/or to estimate or determine ammunition capacity. The video analytics can be used to update a gun type.

The flow 1300 includes identifying shooter suspects in different rooms 1360. The determination of the presence of multiple suspects can be based on separated-by-time or separated-by-distance gunshot events. The determination of multiple shooter suspects can be based on the additional video analytics. The suspects can be tracked 1370. The tracking the suspects can be based on video analytics that identify a gun 1371, tagging a suspect based on a gun 1372, or tracking a suspect where a gun is no longer present 1373. Alternatively, an operator can manually tag a suspect in the analytics with or without a gun for tracking. The tag can be modified 1375 based on additional analytics, operator intervention, an additional gunshot event, or the like. The tracking 1370 can be modified based on the activated audio microphone 1332.

In embodiments, engaging additional video collection on one or more additional video streams, wherein the additional video collection enables tracking the suspected shooter moving out of view of the original video stream. The original video stream is the video stream that was engaged by the detection of the first gunshot or suspected gunshot. In embodiments, the additional video collection enables identification of an additional suspected shooter, wherein the identification of the additional suspected shooter is based on a video signature of the suspected shooter, wherein the video signature of the suspected shooter is analyzed through video classifiers, wherein results from the video classifiers are composited, and wherein the results that are composited provide a tag for further analyzing. In embodiments, analyzing the audio output of an audio microphone based on the detecting of the gunshot, wherein the audio output is passively buffered until the analyzing begins; using audio classifiers to make an identification of a gun type; and updating the identification based on the video analytics, wherein the video analytics includes using video classifiers to make a further identification of the gun type. In embodiments, generating an audio gunshot signature, wherein the audio gunshot signature is used to distinguish one or more additional gunshots from the gunshot that was detected. Various steps in the flow 1300 may be changed in order, repeated, omitted, or the like without departing from the disclosed concepts. Various embodiments of the flow 1300 can be included in a computer program product embodied in a non-transitory computer readable medium that includes code executable by one or more processors.

Figure 14:
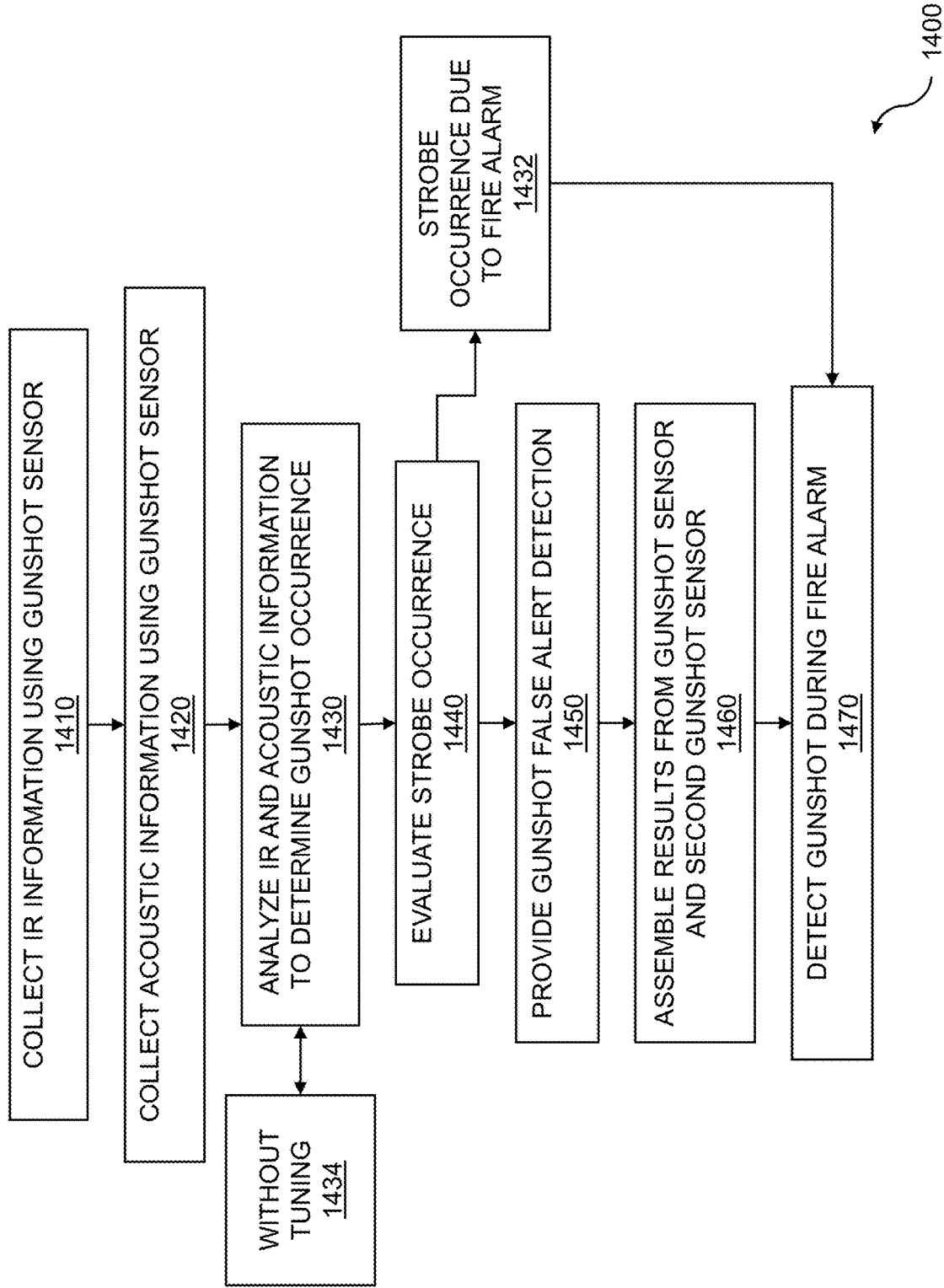
FIG. 14 is a flow diagram for indoor gunshot detection.

FIG. 14 is a flow diagram for indoor gunshot detection. The flow 1400 includes collecting infrared information within an indoor environment using a gunshot sensor 1410. In embodiments, the infrared information collected comprises energy at near-infrared wavelengths such as those ranging from 0.78 to three microns. The flow 1400 includes collecting acoustic information within the indoor environment using the gunshot sensor 1420. The acoustic information can include detection of a shock wave. The shock wave is detected with an acoustic sensor. The shock wave emanates from the projectile as it travels through the air at supersonic speeds. The acoustic information can include the sound wave from the gun itself. The sound wave may be detected by a microphone that is coupled to a pickup circuit with its gain configured to only detect very loud sounds (e.g. 130 decibels or greater).

The flow 1400 includes analyzing the infrared information and the acoustic information to determine a gunshot occurrence, wherein the gunshot occurrence is determined independent of location for the gunshot sensor 1430. The analysis can include identification of a shock wave, an infrared pattern, and/or a sound wave pattern. These three inputs can be used in tandem to detect probabilistically that a gunshot occurred. In embodiments, a score is computed based on the detected levels and characteristics of these three inputs. If the computed score is above a predetermined level, then a gunshot is deemed to have likely occurred.

In embodiments, a spectral signature is identified and may include specifics for light emitted like that seen in near-infrared wavelengths. The duration, such as one to three milliseconds, might vary depending on the firearm. Regarding acoustic information, shock waves are typically formed due to events such as supersonic travel of a projectile, or a nearby lightning strike. The sound wave is a loud sound emitted from the firearm upon discharge. Other factors in an indoor environment can also cause loud sounds, such as fire alarms, doors slamming, and the like.

Complicating the gunshot detection is the fact that one or more of the three aforementioned inputs may be at a low level or undetectable, depending on the orientation and position of the firearm in relation to the gunshot sensor. For example, infrared information typically requires a line-of-sight between the gunshot sensor and the gun. Shock waves mostly travel perpendicular to the projectile path, and thus, the detected shock wave is a function of relative angle between the gunshot and the gunshot sensor. Finally, the sound wave from the muzzle blast can be comingled with other loud sounds in the indoor environment such as fire alarm sirens and/or buzzers.

The flow 1400 includes evaluating strobe occurrence 1440, based on the infrared information and the acoustic information, and using the strobe occurrence to provide gunshot false alert detection. In the flow 1400, the strobe occurrence comprises a fire alarm 1432. The gunshot detection can be affected by a fire alarm. A loud buzzer can be sounded with a periodicity and a strobe associated with the fire alarm might be periodically illuminated. While the strobe might radiate primarily in the visual range, there can be an infrared component to the strobe. Thus, by evaluating strobe occurrence, a more accurate detection of the gunshot is achieved, as the gunshot detector can be configured to automatically window out or ignore sensory input during the brief periods of strobe activation. In the flow 1400, the analyzing can occur irrespective of reverberations. As an example, the infrared component is not impacted by reverberations, so that component can be used with a higher weight than the sound wave information, which is affected by reverberations.

In the flow 1400, the gunshot sensor can collect the acoustic information wherein the reverberations from the gunshot occurrence add cumulatively to the acoustic information. The analyzing can occur irrespective of reflections in the flow 1400, and the gunshot sensor can collect the infrared information wherein the reflections from the gunshot occurrence add cumulatively to the infrared information. In the flow 1400, information on the reflections is not used in false alert of gunshot detection 1450. For example, by utilizing acoustic information from a shock wave, along with an infrared spectral signature, a gunshot detection determination can be made using inputs that are not affected by reverberations. In embodiments, information on the reverberations is not used in false alert of gunshot determinations. In situations where the inputs of shock wave and infrared spectral signature are not present (i.e. due to gun orientation in relation to the gunshot sensor), the sound wave information can be used. A thresholding circuit can be coupled to the acoustic sensor that is configured for sound wave detection. The thresholding circuit can be configured to trigger upon detection of a loud sound (e.g. 130 decibels or greater), and then stay active for a predetermined duration (e.g. 10 milliseconds), followed by a muting for a predetermined duration (e.g. 50 milliseconds). In this way, the acoustic sensor mutes, effectively ignoring reverberations that occur in an indoor environment immediately following a firearm discharge.

In the flow 1400, the analyzing can be accomplished without tuning the gunshot sensor 1434 for the indoor environment in which the gunshot sensor resides. Since the gunshot sensor of disclosed embodiments utilizes multiple inputs to determine the probability of a gunshot, calibration or knowledge of a specific position within the premises is not needed in order to start using the system. A gunshot sensor can simply be installed in the premises to start monitoring for gunshots.

The flow 1400 includes assembling results from the gunshot sensor along with a second gunshot sensor in a gateway device 1460. The gateway device can be used to collect information from multiple gunshot sensors installed within a premise. For example, in a large building such as a school, there can be several gunshot sensors installed in each hallway, and multiple gunshot sensors installed in large areas such as a gymnasium and cafeteria. The gateway device can collect information from each gunshot sensor and forward the information upstream to another system such as a security system. Additionally, in some embodiments, the gateway device communicates configuration and/or control information to each of the connected gunshot sensors. In the flow 1400, assembling the results is accomplished independent of the locations for the gunshot sensor and the second gunshot sensor. This greatly simplifies the installation and setup of a gunshot detection system using gunshot sensors of disclosed embodiments.

The flow 1400 includes detection of a gunshot during a fire alarm 1470. By utilizing the multiple inputs as previously described, disclosed embodiments detect a gunshot even in the presence of a disruptive event such as a fire alarm. In this way, even if an assailant tries to mask the gunshot sounds by first setting off a fire alarm, disclosed embodiments that utilize the described techniques facilitate detection of gunshots, even in the noisy conditions of a fire alarm with an accompanying strobe. Various steps in the flow 1400 may be changed in order, repeated, omitted, or the like without departing from the disclosed concepts. Various embodiments of the flow 1400 can be included in a computer program product embodied in a non-transitory computer readable medium that includes code executable by one or more processors.

Figure 15:
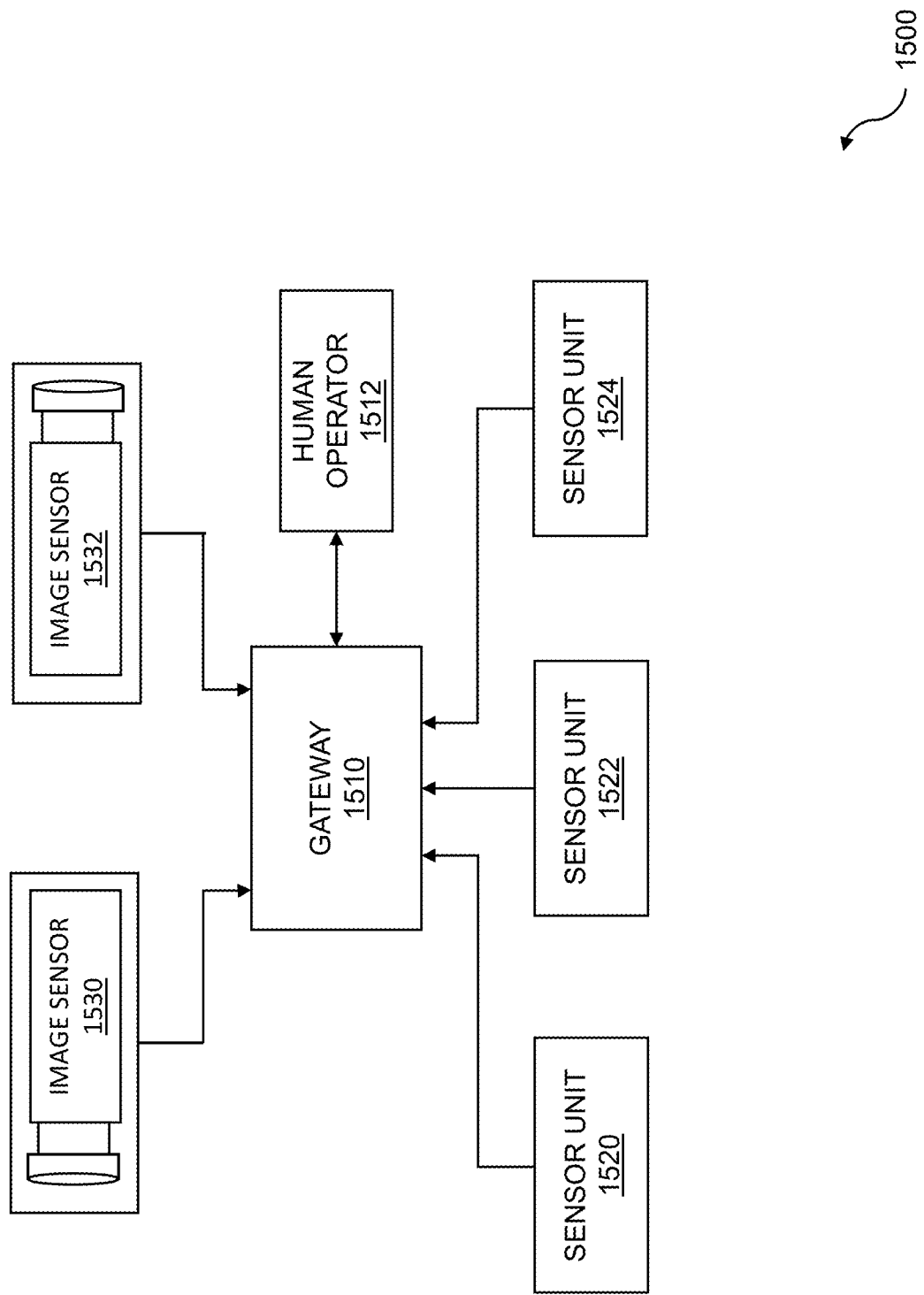
FIG. 15 is an example system gunshot detection system.

FIG. 15 is an example gunshot detection system. Indoor gunshot detection can be based on infrared information and acoustic information, where both types of information can be collected within an indoor environment. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that can be activated. Sensors, cameras, and a central analyzer can be used for indoor gunshot detection with components of a system 1500. A central gateway 1510, or analyzer, can be used for detecting a gunshot in the indoor environment. The central analyzer can control the sensor units and image sensors. The central analyzer can be used to detect a gunshot, engage video collection, and perform video analytics. The central analyzer, or processor, can interact with a human operator 1512. The human operator can interact with the central analyzer to provide oversight. The human operator can tag a person of interest. The tagging by the human operator can be used along with video analytics for tracking the person of interest. The central analyzer can be coupled to a plurality of gunshot sensor units 1520, 1522, and 1524, a plurality of image sensors 1530 and 1532, and so on. The central analyzer can collect infrared information and acoustic information from the sensor units. The central analyzer can be coupled to image sensors 1530 and 1532. The image sensors can be engaged by the central analyzer. The image sensors that can be used can be video cameras, still cameras, or other digital image collection systems and techniques. The central analyzer can perform video analytics, where the video analytics utilize image classifiers. The image classifiers can be used to identify a gun type. A suspected shooter can be identified based on the video analytics. As mentioned above, with oversight from the human operator 1512, where the operator can tag a person of interest, tracking of the person of interest can be conducted using video analytics performed by the central analyzer.

Figure 16:
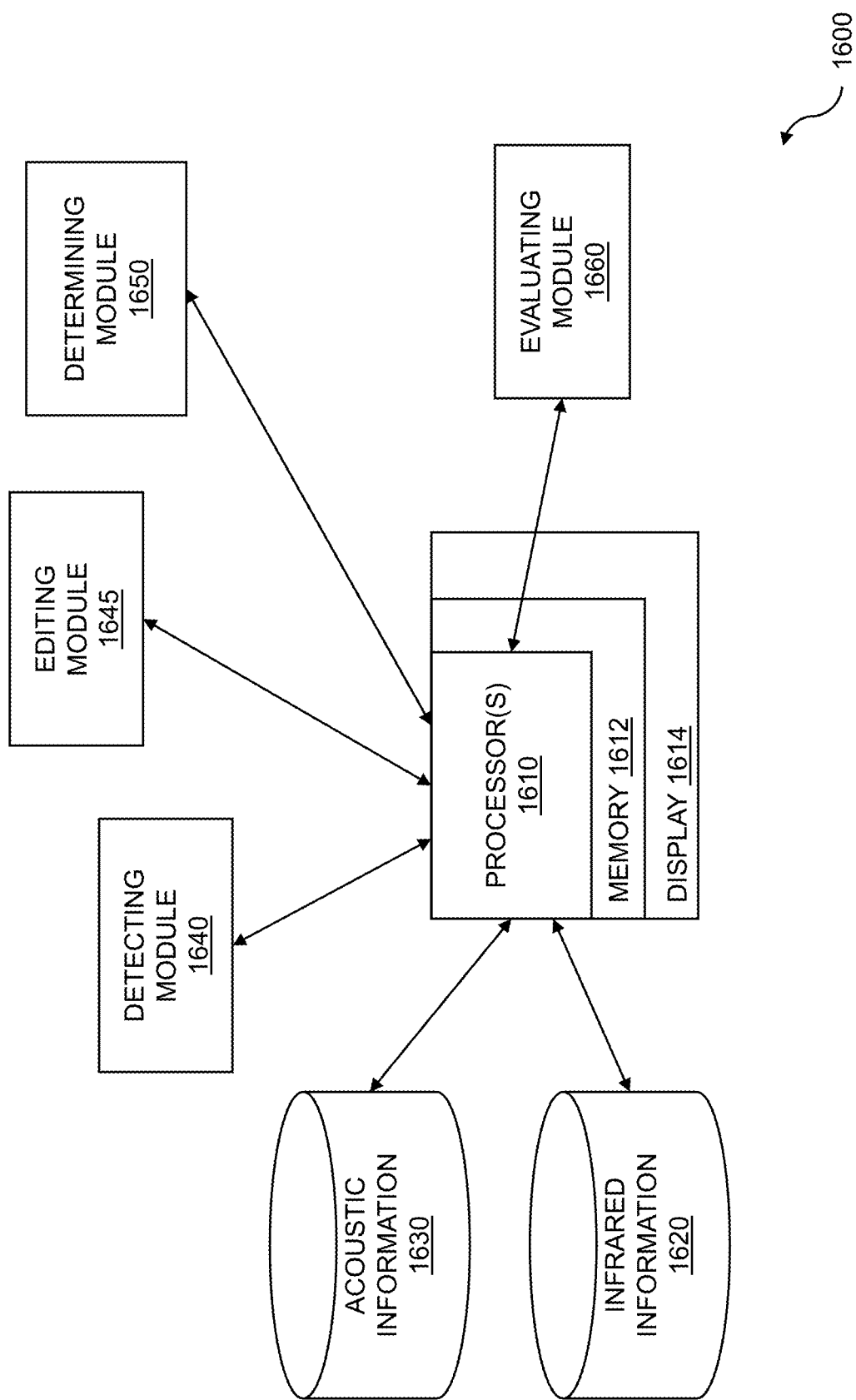
FIG. 16 is a system diagram for indoor gunshot detection.

FIG. 16 is a system diagram for indoor gunshot detection. Gunshot detection analysis can use a gunshot sensor to detect an infrared pulse, where the gunshot sensor can include an infrared sensor and an acoustic sensor. The infrared pulse can be determined to correspond to a strobe occurrence. A gunshot can be evaluated to have not occurred based on the strobe occurrence. A frequency of strobe occurrences can be determined, as can a duration for the strobes within the strobe occurrences. Editing detection can edit out a time window for sensing by the infrared sensor. The system for indoor gunshot detection analysis, where the detection analysis can occur during an ongoing fire alarm, can be implemented using a variety of electronic hardware and software techniques, including one or more processors. A system 1600 is shown for indoor gunshot detection analysis with ongoing fire alarm. The system 1600 can use a gunshot sensor to detect an infrared pulse, where the gunshot sensor can include an infrared sensor and an acoustic sensor. Other sensors such as a visual sensor can also be included. The visual sensor can be used to detect visible light spectra. The system 1600 can determine that the infrared pulse can correspond to a strobe occurrence. The system 1600 can evaluate that a gunshot occurred based on the strobe occurrence. The system 1600 can include one or more processors 1610 coupled to a memory 1612 which can store and retrieve instructions and data, and a display 1614. The obtaining of the infrared information 1620, and the obtaining of the acoustic information 1630, can occur using the one or more processors 1610, or can occur using other processors. The obtaining of the infrared information 1620 and the obtaining of the acoustic information 1630 can occur using a wired or wireless computer network, a wired or wireless sensor network, the Internet, and so on. The infrared information 1620 can be obtained from a gunshot sensor. The gunshot sensor can include an infrared sensor. The infrared information 1620 can be obtained from a plurality of infrared sensors, and the infrared sensors can be pointed to cover different fields of view. The acoustic information 1630 can be obtained from the gunshot sensor, where gunshot sensor can include an acoustic sensor. The acoustic information 1630 can be obtained from a plurality of acoustic sensors, and the acoustic sensors can be pointed in different directions. The acoustic sensors can be attenuated. The acoustic sensors cannot detect voices.

The system 1600 can include a detecting module 1640. The detecting module 1640 can detect a gunshot, in the indoor environment, based on the infrared information 1620 and the acoustic information 1630. The detecting module 1640 can detect a gunshot while the fire alarm is occurring, based on information from the infrared sensor and the acoustic sensor. The detecting module 1640 can be edited, where editing detection can include editing detection of further strobe occurrences based on a frequency of strobe occurrences. The editing module 1645 can edit out a time window for sensing by the infrared sensor. By editing out a time window for sensing by the infrared sensor, acoustic sensor, visual sensor, and so on, sensor data resulting from an event such as a strobe can be edited out of processing gunshot detection. The system 1600 can include a determining module 1650. The determining module can determine that an infrared pulse corresponds to a strobe occurrence, since a strobe occurrence from a strobe of a fire alarm can include infrared spectra, visible light spectra, etc. The determining module 1650 can determine a frequency of strobe occurrences. Fire alarms generally include a visual indicator such as a strobe, a sounder for conveying alarms, codes, and so on. The strobes from the fire alarms can flash at a frequency, where the frequency can be determined by local, state, and national governments, fire safety boards, building code requirements, etc. The determining module 1650 can determine a duration for strobes within the strobe occurrences. The frequency of strobe occurrences and the duration for strobes within strobe occurrences can then be used by the determining module 1650 for various editing purposes.

The system 1600 can include an evaluating module 1660. The evaluating module 1660 can evaluate that a gunshot occurred based on the strobe occurrence. Such evaluating can indicate that an infrared pulse that was detected was not accompanied by a high sound-pressure level acoustic impulse. The infrared pulse unaccompanied by a high sound-pressure level acoustic impulse can result from a fire alarm strobe occurrence rather than a gunshot event. By extension, an infrared pulse that can be accompanied by a high sound pressure level acoustic impulse can be evaluated to detect a gunshot. When infrared pulses unaccompanied by high sound-pressure level acoustic impulses are detected along with infrared pulses accompanied by high sound-pressure level acoustic impulses, then the evaluating module 1660 can evaluate that a gunshot can be detected while a fire alarm is occurring. This evaluating can occur when the gunshot occurs at a different time from the fire alarm strobe occurrence.

In embodiments, a system for gunshot detection comprising: a plurality of gunshot sensor units used to detect an infrared pulse, wherein each of the plurality of gunshot sensor units comprise: an infrared sensor; and an acoustic sensor; an analyzer, coupled to the plurality of gunshot sensor units wherein the analyzer: detects an infrared pulse, based on information collected from a gunshot sensor from the plurality of gunshot sensor units; determines that the infrared pulse corresponds to a strobe occurrence; and evaluates that a gunshot occurred based on the strobe occurrence. In embodiments, the system 1600 can include a computer program product embodied in a non-transitory computer readable medium for gunshot detection, the computer program product comprising code for: using a gunshot sensor to detect an infrared pulse, wherein the gunshot sensor comprises: an infrared sensor; and an acoustic sensor; determining that the infrared pulse corresponds to a strobe occurrence; and evaluating that a gunshot occurred based on the strobe occurrence.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate, the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A processor-implemented method for gunshot analysis comprising:
    using a gunshot sensor to detect an infrared pulse, wherein the gunshot sensor comprises:
        an infrared sensor; and
        an acoustic sensor;
    determining that the infrared pulse corresponds to a strobe occurrence, wherein the strobe occurrence is part of a sequence of strobes; and
    evaluating that a gunshot occurred based on the strobe occurrence.

2. The method of claim 1 wherein the strobe occurrence comprises a fire alarm.

3. The method of claim 2 further comprising detecting a gunshot, while the fire alarm is occurring, based on information from the infrared sensor and the acoustic sensor.

4. The method of claim 3 wherein the gunshot occurs at a different time from the strobe occurrence.

5. The method of claim 1 wherein the strobe occurrence interferes with gunshot detection evaluation.

6. The method of claim 1 wherein the acoustic sensor senses an absence of an acoustic pressure wave corresponding to a gunshot during a timeframe of the strobe occurrence.

7. The method of claim 1 further comprising determining a frequency of strobe occurrences.

8. The method of claim 7 further comprising determining a duration for strobes within the strobe occurrences.

9. The method of claim 7 further comprising editing detection of further strobe occurrences based on the frequency of strobe occurrences.

10. The method of claim 9 wherein the editing detection edits out a time window for sensing by the infrared sensor.

11. The method of claim 10 wherein the time window is less than or equal to four percent of a time period between strobe occurrences.

12. The method of claim 9 further comprising tuning the editing as more information on the sequence of strobes is collected.

13. The method of claim 9 wherein the gunshot sensor further comprises an analog-to-digital converter and logic to perform gunshot detection and wherein the analog-to-digital converter is interposed between the infrared sensor and the logic.

14. The method of claim 13 wherein the editing detection is accomplished between the analog-to-digital converter and the logic to perform gunshot detection.

15. The method of claim 9 further comprising eliminating the editing once the further strobe occurrences discontinue.

16. The method of claim 15 further comprising resuming the editing when further strobe occurrences resume.

17. The method of claim 1 further comprising detecting a second infrared pulse corresponding to a second sequence of strobes.

18. The method of claim 17 further comprising determining a frequency of strobe occurrence for the second sequence of strobes.

19. The method of claim 18 further comprising editing detection of a second set of further strobe occurrences based on the frequency of the second sequence of strobes.

20. The method of claim 1 wherein the gunshot sensor further comprises a flash detector that detects a component of visible light.

21. The method of claim 20 wherein the flash detector is used in the determining that the infrared pulse corresponds to a strobe occurrence.

22. The method of claim 1 further comprising providing information to a gunshot detection system, from the gunshot sensor, that a fire alarm is occurring based on the strobe occurrence.

23. The method of claim 22 further comprising modifying detection by other sensors based on the fire alarm occurring.

24. The method of claim 1 further comprising communicating between a fire alarm system and a gunshot detection system, comprising the gunshot sensor, so that the fire alarm system provides a fire alarm notification to the gunshot detection system of a fire alarm and further evaluating that a gunshot did not occur based on the fire alarm notification.

25. The method of claim 1 wherein the gunshot sensor is within an indoor environment.

26. A system for gunshot detection comprising:
a plurality of gunshot sensor units used to detect an infrared pulse, wherein each of the plurality of gunshot sensor units comprises:
an infrared sensor; and
an acoustic sensor;
an analyzer, coupled to the plurality of gunshot sensor units wherein the analyzer:
detects an infrared pulse, based on information collected from a gunshot sensor from the plurality of gunshot sensor units;
determines that the infrared pulse corresponds to a strobe occurrence, wherein the strobe occurrence is part of a sequence of strobes; and
evaluates that a gunshot occurred based on the strobe occurrence.

27. A computer program product embodied in a non-transitory computer readable medium for gunshot detection, the computer program product comprising code which causes one or more processors to perform operations of:
using a gunshot sensor to detect an infrared pulse, wherein the gunshot sensor comprises:
an infrared sensor; and
an acoustic sensor;
determining that the infrared pulse corresponds to a strobe occurrence, wherein the strobe occurrence is part of a sequence of strobes; and
evaluating that a gunshot occurred based on the strobe occurrence.

* * * * *